(12) United States Patent
Audebert et al.

(10) Patent No.: US 7,316,030 B2
(45) Date of Patent: Jan. 1, 2008

(54) METHOD AND SYSTEM FOR AUTHENTICATING A PERSONAL SECURITY DEVICE VIS-À-VIS AT LEAST ONE REMOTE COMPUTER SYSTEM

(75) Inventors: Yves Louis Gabriel Audebert, Los Gatos, CA (US); Olivier Clemot, Rueil-Malmaison (FR)

(73) Assignee: Activcard Ireland, Limited, Dublin (IE)

( * ) Notice: Subject to any disclaimer, the term of this patent is extended or adjusted under 35 U.S.C. 154(b) by 594 days.

(21) Appl. No.: 10/476,316

(22) PCT Filed: Apr. 9, 2002

(86) PCT No.: PCT/EP02/03929

§ 371 (c)(1),
(2), (4) Date: Oct. 29, 2003

(87) PCT Pub. No.: WO02/089444

PCT Pub. Date: Nov. 7, 2002

(65) Prior Publication Data

US 2004/0143762 A1   Jul. 22, 2004

(51) Int. Cl.
*G06F 21/00* (2006.01)
*G06F 15/16* (2006.01)
*H04L 9/00* (2006.01)
*H04K 1/00* (2006.01)

(52) U.S. Cl. .............................. 726/14; 726/5; 713/168
(58) Field of Classification Search ...................... None
See application file for complete search history.

(56) References Cited

U.S. PATENT DOCUMENTS

| | | | |
|---|---|---|---|
| 5,276,735 A | 1/1994 | Boebert et al. | 713/167 |
| 5,455,863 A | 10/1995 | Brown et al. | 380/247 |
| 5,499,297 A | 3/1996 | Boebert | 713/159 |
| 5,761,309 A | 6/1998 | Ohashi et al. | |
| 5,778,071 A * | 7/1998 | Caputo et al. | 713/159 |

(Continued)

FOREIGN PATENT DOCUMENTS

DE           19522527           1/1997

(Continued)

OTHER PUBLICATIONS

Office Action dated Aug. 3, 2006 in U.S. Appl. No. 10/085,127.

(Continued)

*Primary Examiner*—Christopher Revak
(74) *Attorney, Agent, or Firm*—Stevens, Davis, Miller & Mosher, LLP

(57) ABSTRACT

The present invention provides a method for authenticating at least one Personal Security Device PSD (1040) vis-ô-vis at least a first Remote Computer System (1050) over a first network (1045) using at least one Client (1010) as a host to said at least one PSD (1040), said method comprising the steps of: a) establishing at least one communications pipe (1075) over said first network (1045) between said at least one PSD (1040) and said at least first Remote Computer System (1050); and b) running a challenge/response process between said Remote Computer System (1050) and said at least one PSD (1040) through said at least one communications pipe (1075).

18 Claims, 15 Drawing Sheets

U.S. PATENT DOCUMENTS

Figure 1:
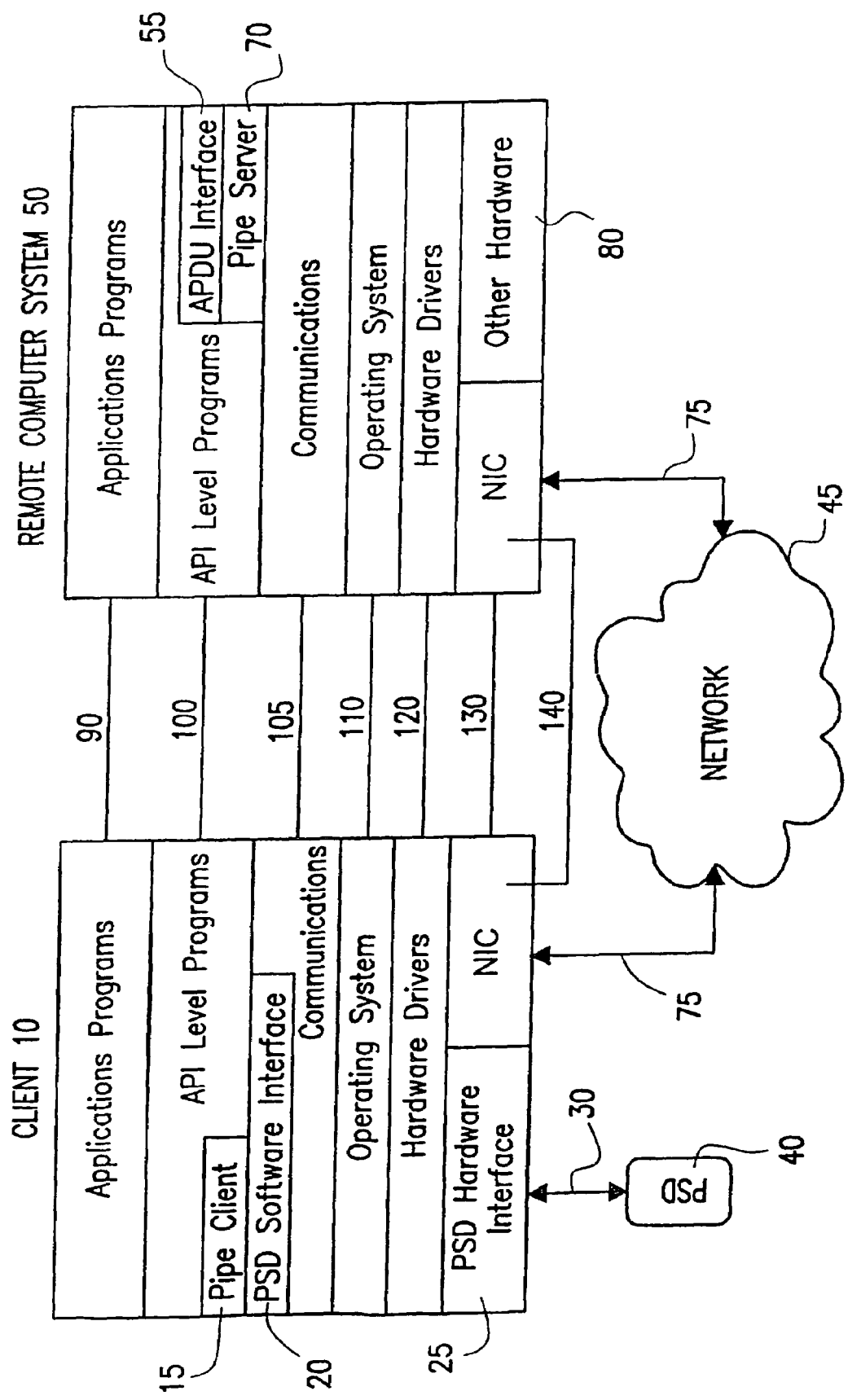

| | | | |
|---|---|---|---|
| 5,917,168 | A | 6/1999 | Nakamura et al. |
| 5,944,821 | A | 8/1999 | Angelo |
| 5,991,407 | A | 11/1999 | Murto |
| 6,005,942 | A | 12/1999 | Chan et al. |
| 6,018,779 | A | 1/2000 | Blumenau |
| 6,101,254 | A | 8/2000 | Thiriet |
| 6,101,255 | A | 8/2000 | Harrison et al. |
| 6,105,008 | A | 8/2000 | Davis et al. .................. 705/41 |
| 6,108,789 | A | 8/2000 | Dancs et al. |
| 6,128,338 | A | 10/2000 | Behaghel et al. |
| 6,131,811 | A | 10/2000 | Gangi |
| 6,144,671 | A | 11/2000 | Perinpanathan et al. |
| 6,181,735 | B1 | 1/2001 | Sarat |
| 6,192,473 | B1 | 2/2001 | Ryan, Jr. et al. |
| 6,195,700 | B1 | 2/2001 | Bender et al. |
| 6,233,683 | B1 | 5/2001 | Chan et al. |
| 6,279,047 | B1 | 8/2001 | Bublitz et al. |
| 6,385,729 | B1 | 5/2002 | DiGiorgio et al. |
| 6,434,238 | B1 | 8/2002 | Chaum et al. |
| 6,481,632 | B2 | 11/2002 | Wentker et al. ............. 235/492 |
| 6,575,360 | B1 | 6/2003 | Hagn |
| 6,602,469 | B1 | 8/2003 | Maus et al. |
| 6,694,436 | B1 | 2/2004 | Audebert |
| 6,718,314 | B2 | 4/2004 | Chaum et al. |
| 6,751,671 | B1 | 6/2004 | Urien |
| 6,807,561 | B2 | 10/2004 | Lagosanto et al. |
| 6,892,301 | B1 | 5/2005 | Hansmann et al. |
| 6,944,650 | B1 | 9/2005 | Urien |
| 6,993,131 | B1 | 1/2006 | Meyers |
| 7,028,187 | B1 | 4/2006 | Rosen |
| 7,042,903 | B2* | 5/2006 | Coulier ....................... 370/466 |
| 7,046,810 | B2 | 5/2006 | Takada et al. |
| 7,249,373 | B2* | 7/2007 | Shewchuk et al. ............. 726/5 |
| 2001/0039587 | A1 | 11/2001 | Uhler et al. |
| 2001/0045451 | A1 | 11/2001 | Tan et al. |
| 2002/0025046 | A1 | 2/2002 | Lin |
| 2002/0040936 | A1 | 4/2002 | Wentker et al. |
| 2002/0194499 | A1* | 12/2002 | Audebert et al. ........... 713/201 |
| 2005/0195809 | A1* | 9/2005 | Zanaty ....................... 370/389 |
| 2006/0046693 | A1* | 3/2006 | Tran et al. .................. 455/411 |

FOREIGN PATENT DOCUMENTS

| | | |
|---|---|---|
| DE | 19724901 | 12/1998 |
| EP | 0911772 | 4/1999 |
| EP | 0923211 | 6/1999 |
| FR | 2779018 | 11/1999 |
| WO | 9852161 | 11/1998 |
| WO | 9962037 | 12/1999 |
| WO | 9962210 | 12/1999 |
| WO | 0116900 | 3/2001 |
| WO | 0122373 | 3/2001 |
| WO | 0159730 | 8/2001 |

OTHER PUBLICATIONS

Office Action dated Oct. 20, 2005 in U.S. Appl. No. 09/844,272.
Office Action dated Jan. 17, 2006 in U.S. Appl. No. 10/085,127.
Naomaru Itoi, et al., "Secure Internet Smartcards," CITI Technical Report 00-6, Program in Smartcard Technology, http://www.citi. umich.edu/projects/smartcard/, Center for Information Technology Integration, Aug. 24, 2000, 13 pages total.
International Search Report dated Mar. 9, 2002.
International Search Report dated Apr. 23, 2003.
European Telecommunications Standards Institute: "Digital Cellular Telecommunications System (Phase 2+) (GSM); Universal Mobile telecommunications System (UMTS); Security Mechanisms for the (U) SIM application toolkit; Stage 2; (3GPP TS 23.048 version 4.1.0 Release 4)" ETSI TS 123 048 V4.1.0, Sep. 2001, pp. 1-35, XP002237189 ETSI Technical Specification.
"Digital Cellular Telecommunications System (Phase 2+) (GSM); Specification of the SIM Application Toolkit for the Subscriber Identity Module—Mobile Equipment (SIM—ME) Interface (GSM 11.14 version 8.3.0 Release 1999)" ETSI TS 101 267 V8.3.0, XX, XX, Aug. 2000, pp. 1-69, 114, 115, XP002222021.
U.S. Appl. No. 09/844,246 entitled "Method And System For Establishing A Remote Connection To A Personal Security Device", filed Apr. 30, 2001, by Y. Audebert, et al.
U.S. Appl. No. 09/844,439 entitled "Method And System For Authentication Through A Communications Pipe", filed Apr. 30, 2001, by Y. Audebert, et al.
T. Ebringer, et al.; "Parasitic Authentication To Protect Your E-Wallet," Computer, IEEE Computer Society, Long Breach, CA, US, US, vol. 33, No. 10, Oct. 1, 2000, XP001001747, ISBN: 0018-9162, pp. 54-60.
P. Trommler, et al.; "Smart cards and the OpenCard Framework," Java World, Jan. 1998, XP002173639, pp. 1-12.
International Search Report dated May 28, 2003.
Global Platform, Open Platform, Terminal Specification, Version 1.5, Nov. 1999.
Global Platform, Open Platform Terminal Framework, API Version 1.5.4, Jul. 20, 2000.
Global Platform, Multi Application—Smart Card Management Systems, Global Platform Functional Requirements, Version 3.3, Nov. 2000.
ISO/IEC 7816-4: 1995/Amd.1:1997(E) Information technology, Identification card, Integrated circuit(s) cards with contacts, Part 4: Interindustry commands for interchange, Amendment 1.
ISO/IEC 7816-4: 1995(E) Information technology, Identification cards, Integrated circuit(s) cards with contacts, Part 4: Interindustry commands for interchange.
ISO/IEC 7816-5: 1994/Amd. 1: 1996(E) Identification cards, Integrated circuit(s) cards with contacts, Part 5: Numbering system and registration procedure for application identifiers, Amendment 1.
ISO/IEC 7816-5: 1994(E) Identification cards, Integrated circuit(s) cards with contact, Part 5: Numbering system and registration procedure for application identifiers.
Java Card 2.1 Application Programming Interface Sun Microsystems, Inc. Final Revision 1.1, Jun. 7, 1999.
Chen, Zhiqun, "How to write a Java Card applet: a Developer's Guide", Javaword, Jul. 1999.
Chen, Zhiqun et al., "Understanding Java Card 2.0," Javaworld, Mar. 1998.
Posey, Brien, "Using Smart Cards with Windows 2000," TechCrawler.com, Sep. 28, 2000.
International Search Report dated Aug. 23, 2002.

* cited by examiner

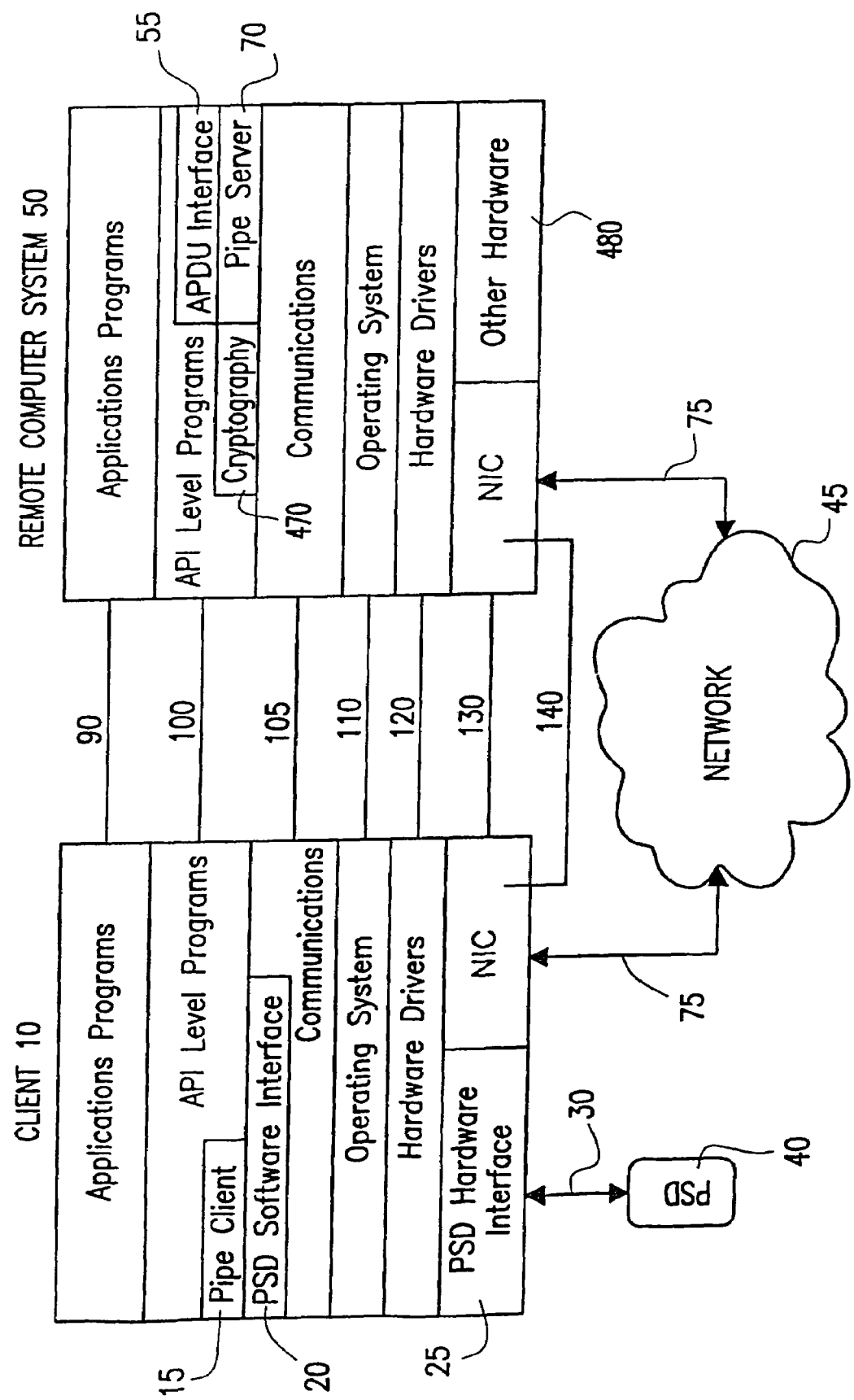

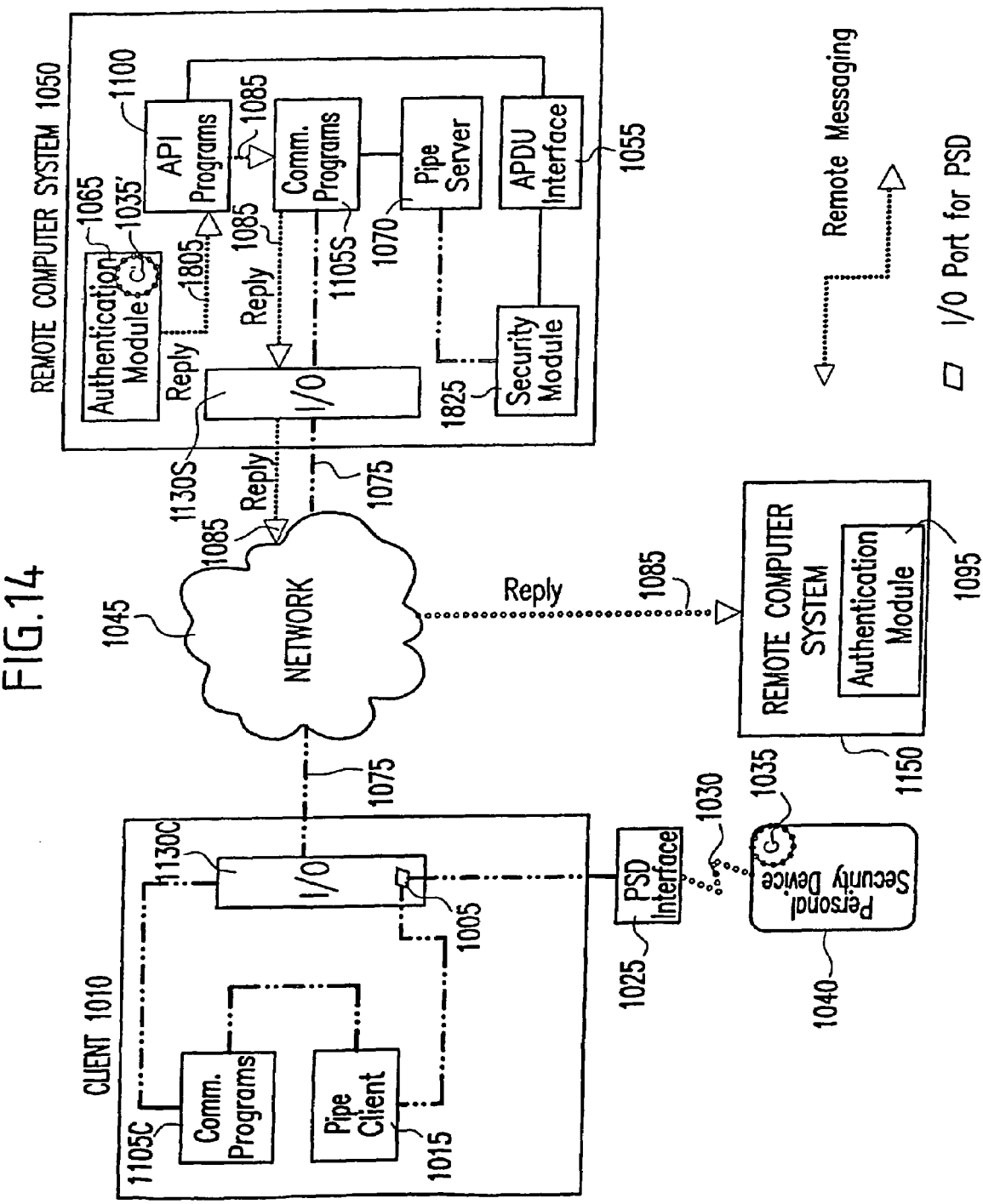

METHOD AND SYSTEM FOR AUTHENTICATING A PERSONAL SECURITY DEVICE VIS-À-VIS AT LEAST ONE REMOTE COMPUTER SYSTEM

1. FIELD OF INVENTION

The present invention relates to a method and system for authenticating a Personal Security Device (PSD) vis-à-vis at least one Remote Computer System. More particularly, the present invention relates to a method and system for authenticating a Personal Security Device (PSD) vis-à-vis a plurality of Remote Computer Systems.

2. BACKGROUND OF INVENTION

One of the simplest and most commonly used authentication methods employed is the static password, whereby a Client computer challenges an end user for a pre-determined password. Once the end user provides the correct password, access is permitted to secure functions or data available on one or more Remote Computer Systems. A significant limitation of the current art is that localized authentication transactions are potentially vulnerable to compromise by unauthorized programs running on the local Client or by other illicit means intending to monitor the password authentication process. In a single point authentication process, once a point of entry to a network is compromised, all locations using the same security codes are generally compromised as well.

One security method commonly used to overcome single point authentication failures employs the use of separate static passwords for each pre-determined secure resource. While this method is an improvement over a single multi-use password, this method is still vulnerable to illicit password monitoring, requires an end user to remember multiple passwords, and inefficiently ties up network resources by repeating the entire authentication process each time access to a different secure resource is requested.

Also, as a practical consideration, requiring an end user to remember several different passwords typically results in the same password being used for all secure resources, hence defeating the entire purpose of performing multiple authentications using static passwords.

A more sophisticated approach than the previously described methods, involves the use of Personal Security Devices (PSD) such as smart cards, which allows storage of multiple credentials, passwords, certificates, private keys, etc. By implementing the use of smart cards, the ability to compromise passwords is significantly reduced. However, PSDs are still somewhat vulnerable to illicit monitoring during transactions with local Client. An additional limitation of this method becomes apparent when attempting to perform multiple authenticating transactions using a single PSD over a network connection. The PSD, beings a slow serial device, only allows one transaction to occur at a time. In addition, network contention and processor execution speed issues become particularly problematic when low bandwidth connections (e.g. dialup connections) are made between a Client and a Remote Computer System during authentication with the PSD.

3. SUMMARY OF INVENTION

It is an object of the present invention to provide a more secure method for authenticating a PSD vis-à-vis at least one Remote Computer System.

This object is achieved with a method for authenticating at least one PSD vis-à-vis at least a first Remote Computer System over a first network using at least one Client as a host to said at least one PSD, said method comprising the steps of:
  a) establishing at least one communications pipe over said first network between said at least one PSD and said at least first Remote Computer System (1050),
  b) generating or retrieving, in said at least first Remote Computer System, a first authentication challenge as a PSD-formatted message,
  c) transmitting said first authentication challenge from said at least first Remote Computer System (1050) to said at least one PSD through said at least one communications pipe,
  d) challenging said at least one PSD with said first authentication challenge, thereby generating a first authentication response as a PSD-formatted message,
  e) transmitting said first authentication response from said at least one PSD to said at least first Remote Computer System through said at least one communications pipe, and
  f) authenticating, in said at least first Remote Computer System, said first authentication response.

With this method, sensitive data processing is performed only within the Remote Computer System(s), i.e. in highly secure and protected domain(s), which greatly reduces the chances of unauthorized access or interception.

It is another object of the present invention to facilitate multiple authenticating transactions between a single PSD and a plurality or Remote Computer Systems.

According to a first embodiment, this other object of the invention can be achieved with a method according for authenticating said at least one PSD vis-à-vis at least one subsequent Remote Computer System which is functionally connected to said at least first Remote Computer System through a second network, said method comprising, in addition to the above-mentioned steps, the further steps of:
  aa) generating or retrieving, in said at least one subsequent Remote Computer System, a second authentication challenge,
  ab) transmitting said second authentication challenge from said at least one subsequent Remote Computer System to said at least first Remote Computer System via said second network,
  ac) converting said second authentication challenge in a PSD-formatted message,
  ad) transmitting said second authentication challenge from said at least first Remote Computer System to said at least one PSD through said at least one communications pipe,
  ae) challenging said at least one PSD with said second authentication challenge, thereby generating a second authentication response,
  af) transmitting said second authentication response from said at least one PSD to said at least first Remote Computer System through said at least one communications pipe,
  ag) transmitting said second authentication response from said at least first Remote Computer System to said at least one subsequent Remote Computer System via said second network, and
  ah) authenticating, in said at least one subsequent Remote Computer System, said second authentication response.

According to a second embodiment, said other object of the invention can be achieved with a method for authenticating said at least one PSD vis-à-vis at least one subsequent Remote Computer System which is functionally connected to said at least first Remote Computer System through a second network, said method comprising, in addition to the above-mentioned steps, the further steps of:

ba) sending to said at least one PSD a credentials transfer command, bb) transmitting credentials from said at least one PSD to said at least first Remote Computer System through said at least one communications pipe, bc) storing said credentials in said at least first Remote Computer System, bd) generating or retrieving, in said at least one subsequent Remote Computer System, a second authentication challenge, be) transmitting said second authentication challenge from said at least one subsequent Remote Computer System to said at least first Remote Computer System via said second network, bf) challenging said stored credentials with said second authentication challenge, thereby generating a second authentication response, bg) transmitting said second authentication response from said at least first Remote Computer System to said at least one subsequent Remote Computer System via said second network, and bh) authenticating, in said at least one subsequent Remote Computer System, said second authentication response.

In said first and second embodiments, the first Remote Computer System establishing and maintaining the communications pipe with the PSD performs an initial authentication, and then acts as a secure hub and Client authentication proxy for subsequent Remote Computer Systems requesting Client authentication.

In a multi-tasking operating environment, multiple authentications occur as background transactions, which are transparent to the end user. The Remote Computer System acting as a secure hub may form multiple communications pipes with other Clients connected to a network. Authentication transactions will occur more rapidly and seamlessly, since Remote Computer Systems are generally provided with greater network bandwidth and processing power than local Clients.

By relocating the authentication process to a Remote Computer System acting as a secure hub, a more simplified means to perform end-to-end authentication and maintain an audit trail of transactions by authenticated end users and transactions with subsequent Remote Computer Systems is readily accomplished since all authentication transactions are routed through the Remote Computer System acting as a secure hub.

In said first embodiment of the invention, the Remote Computer System acting as a secure hub performs the initial Client authentication and then routes subsequent authentication challenges through the communications pipe to the PSD for processing within the PSD, then returns the PSD generated authentication response back through the communications pipe over a network and to the challenging Remote Computer System.

In said second embodiment of the invention, the Remote Computer System acting as a secure hub performs the initial Client authentication and then copies, if not already present, the PSD's authentication credentials through the communications pipe to a secure storage location within the secure hub. The secure hub using the transferred PSD credentials and equivalent algorithms authenticates the Client to subsequent Remote Computer Systems by emulating the PSD.

In both of said embodiments, communications between local Clients and Remote Computers Systems over one or more networks can employ secure communications protocols, such as TCP/IP with Secure Socket Layer (SSL) encryption, IPSEC, etc., which further reduces the likelihood of unauthorized access or interception. For non-proprietary transactions with the PSD, secure communications are optional.

Additional security improvements may be facilitated by establishing a secure communications pipe between the PSD and the Remote Computer System acting as a secure hub, i.e. a communications pipe in which end-to-end cryptographic means are involved (see section 5.1.2. below).

Such cryptographic means can be implemented by software-based security mechanisms or by a Hardware Security Module (HSM) functionally connected to the Remote Computer System acting as a secure hub.

It is another object of the invention to provide a system for implementing the above-mentioned method.

4. BRIEF DESCRIPTION OF DRAWINGS

Figure 2:
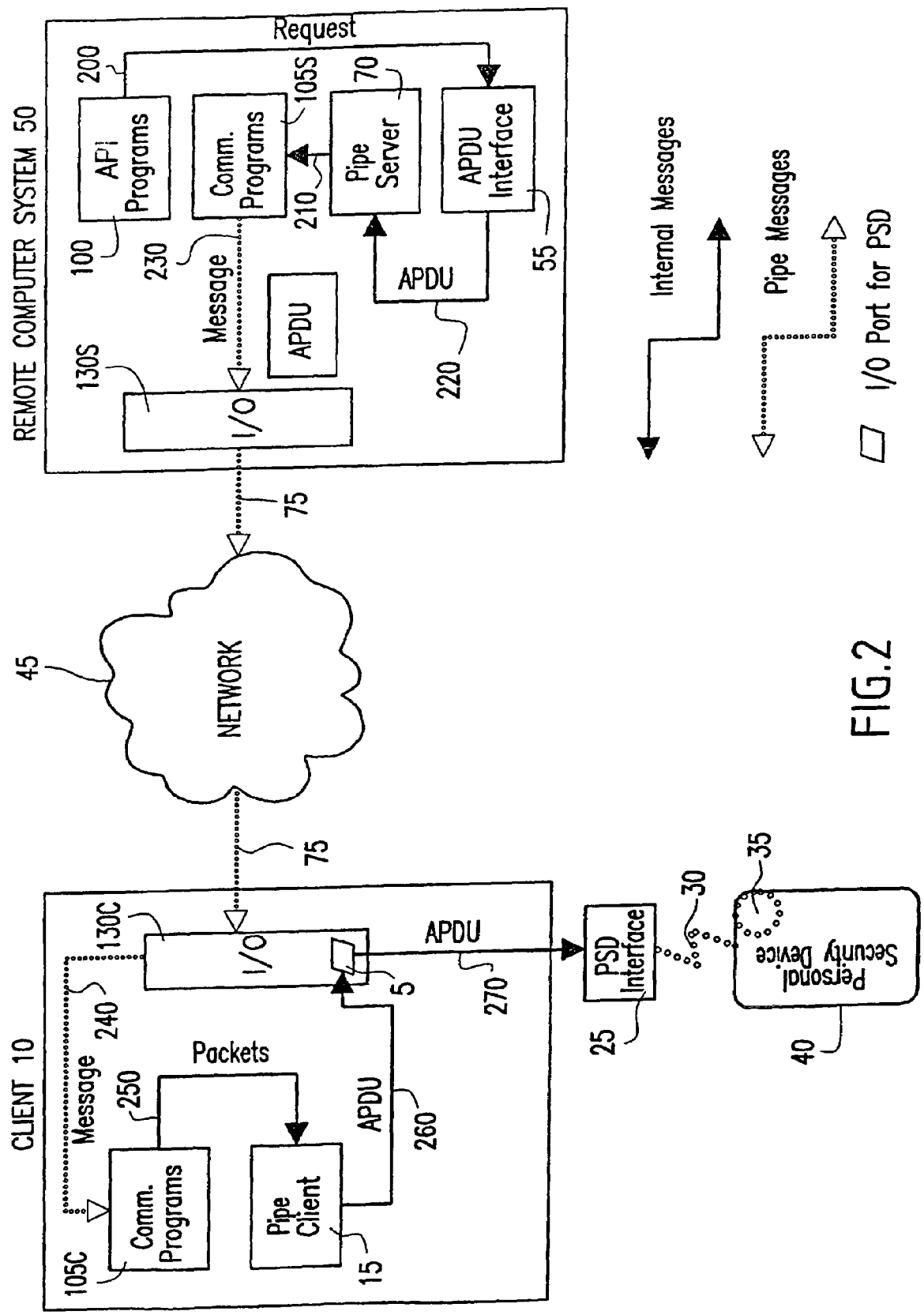
Figure 3:
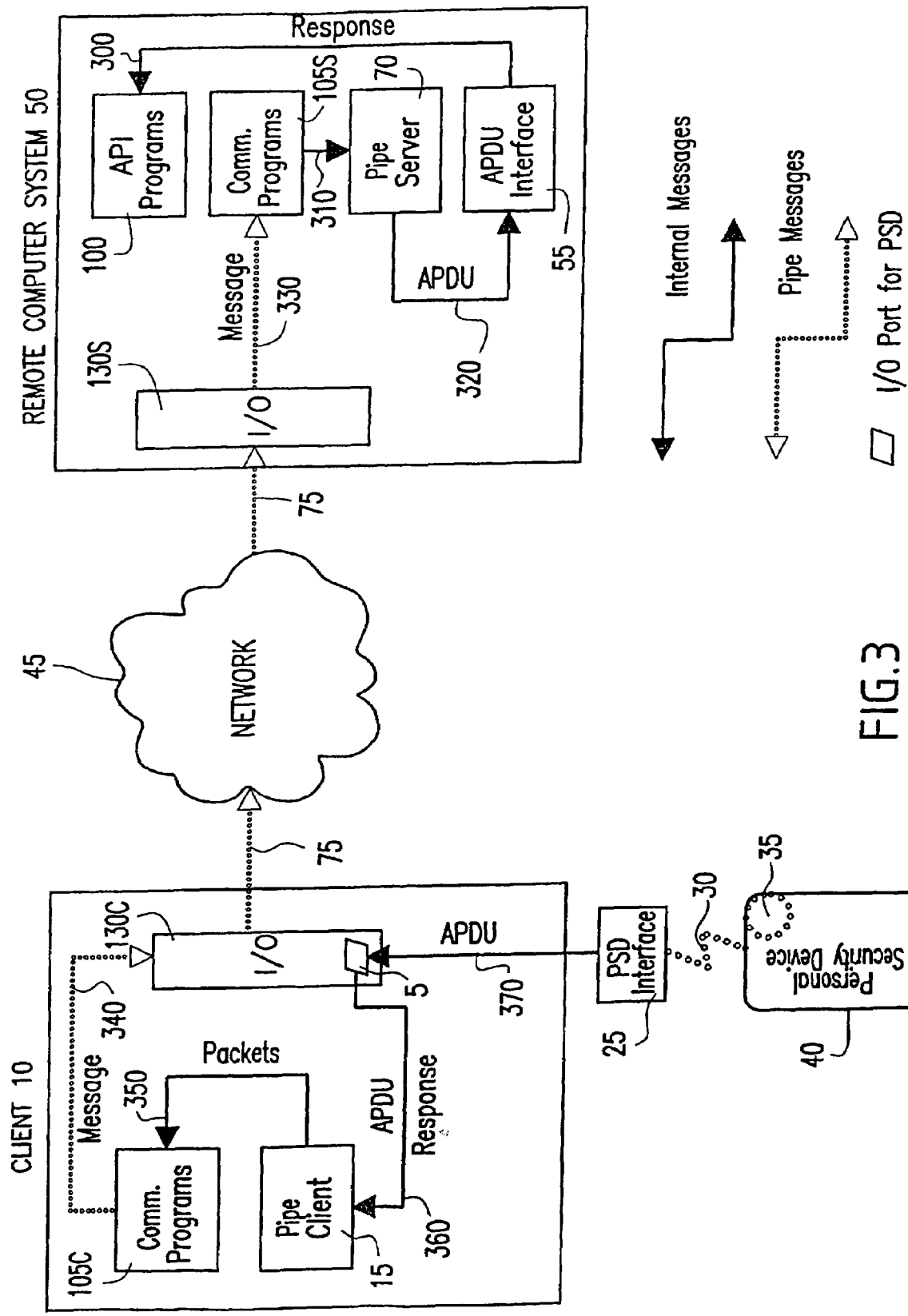
Figure 4B:
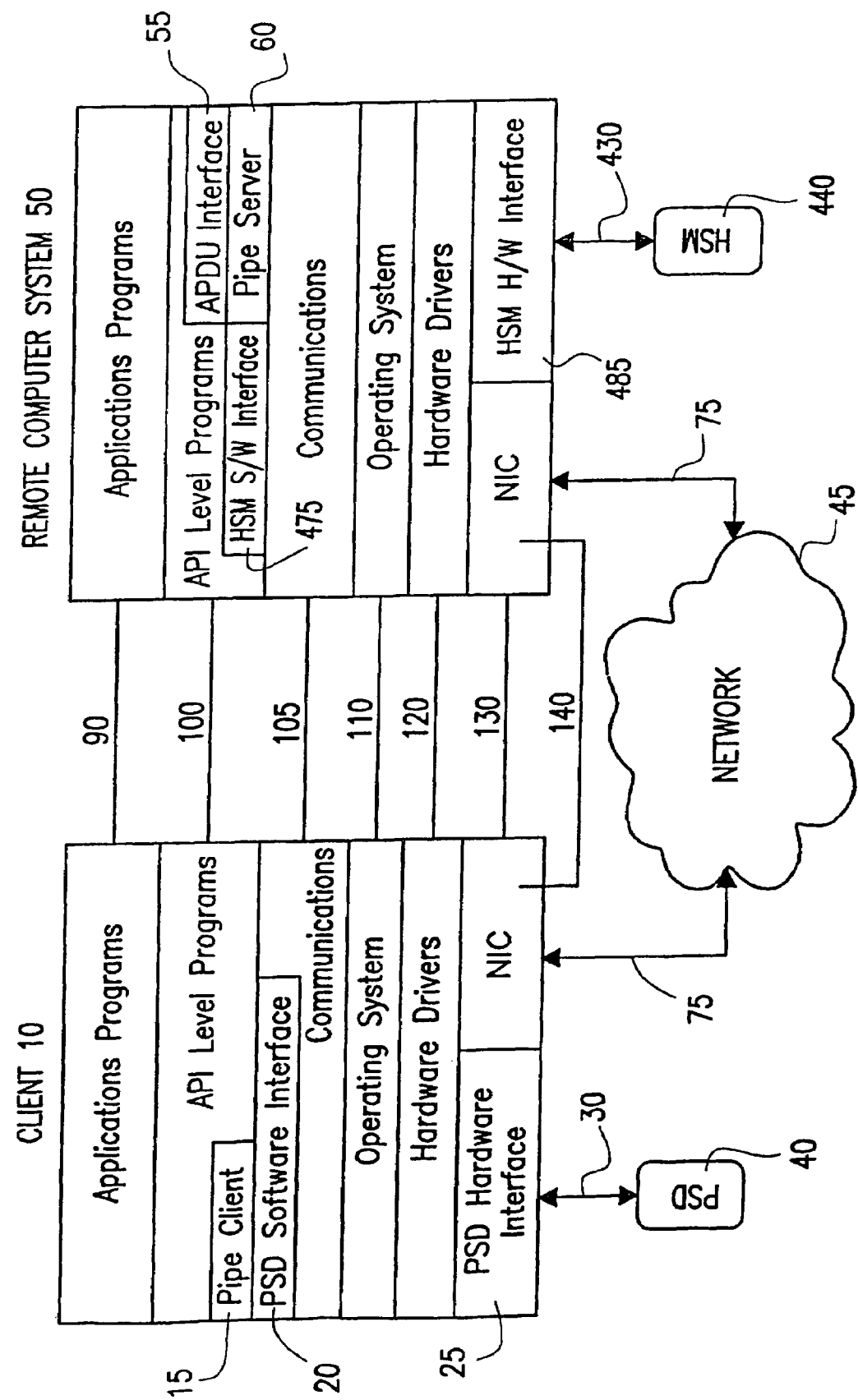
Figure 5:
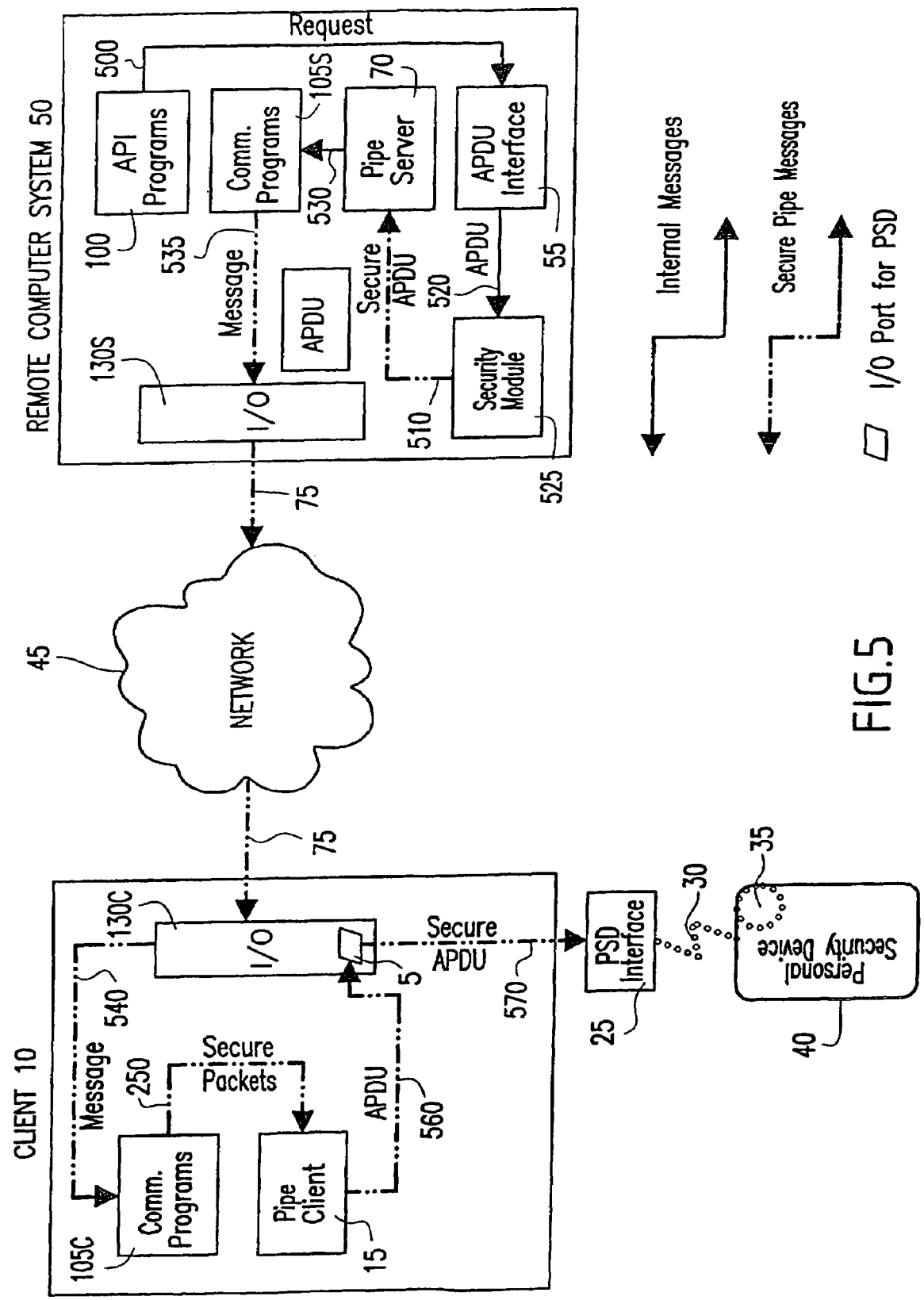
Figure 6:
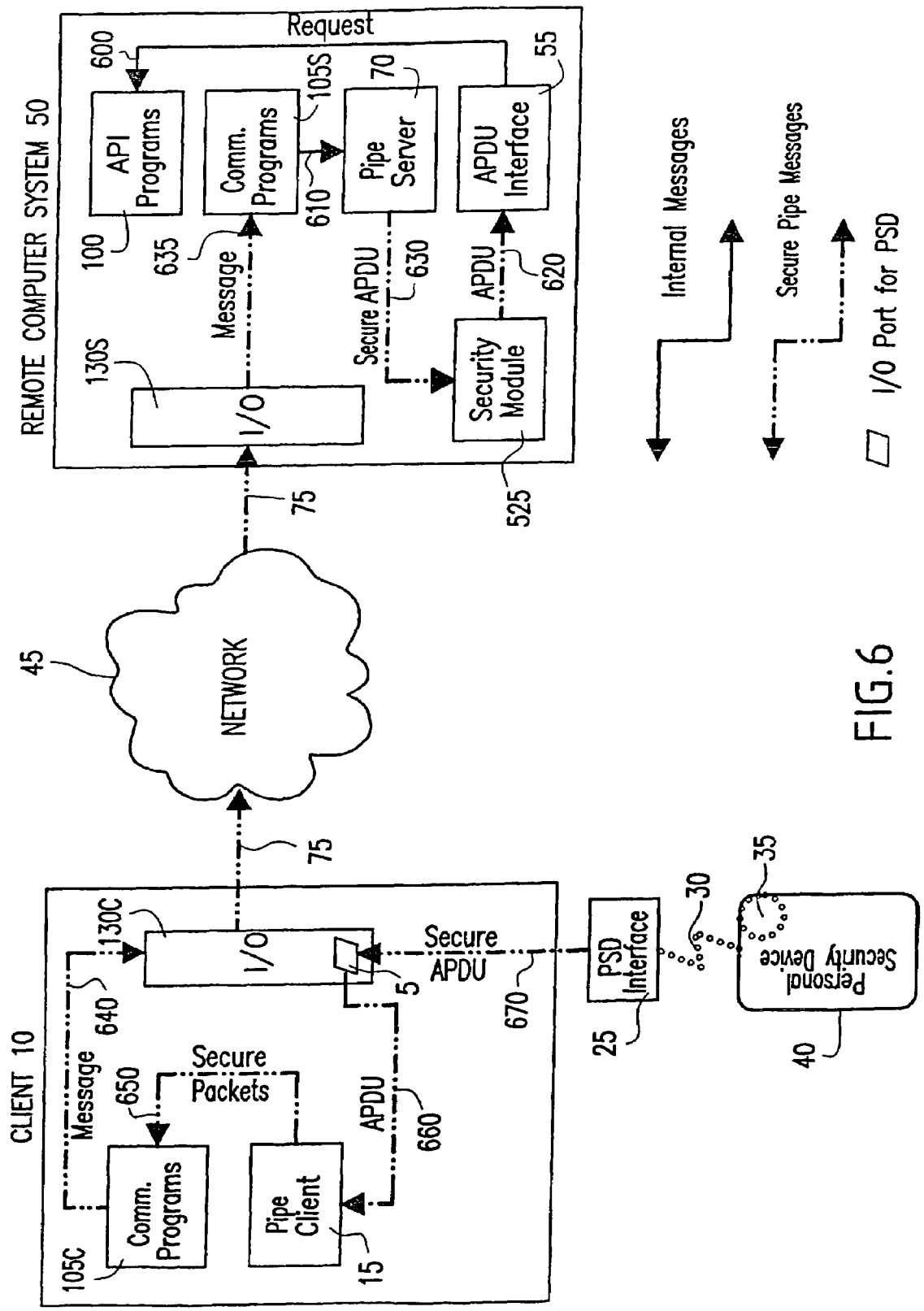
Figure 7:
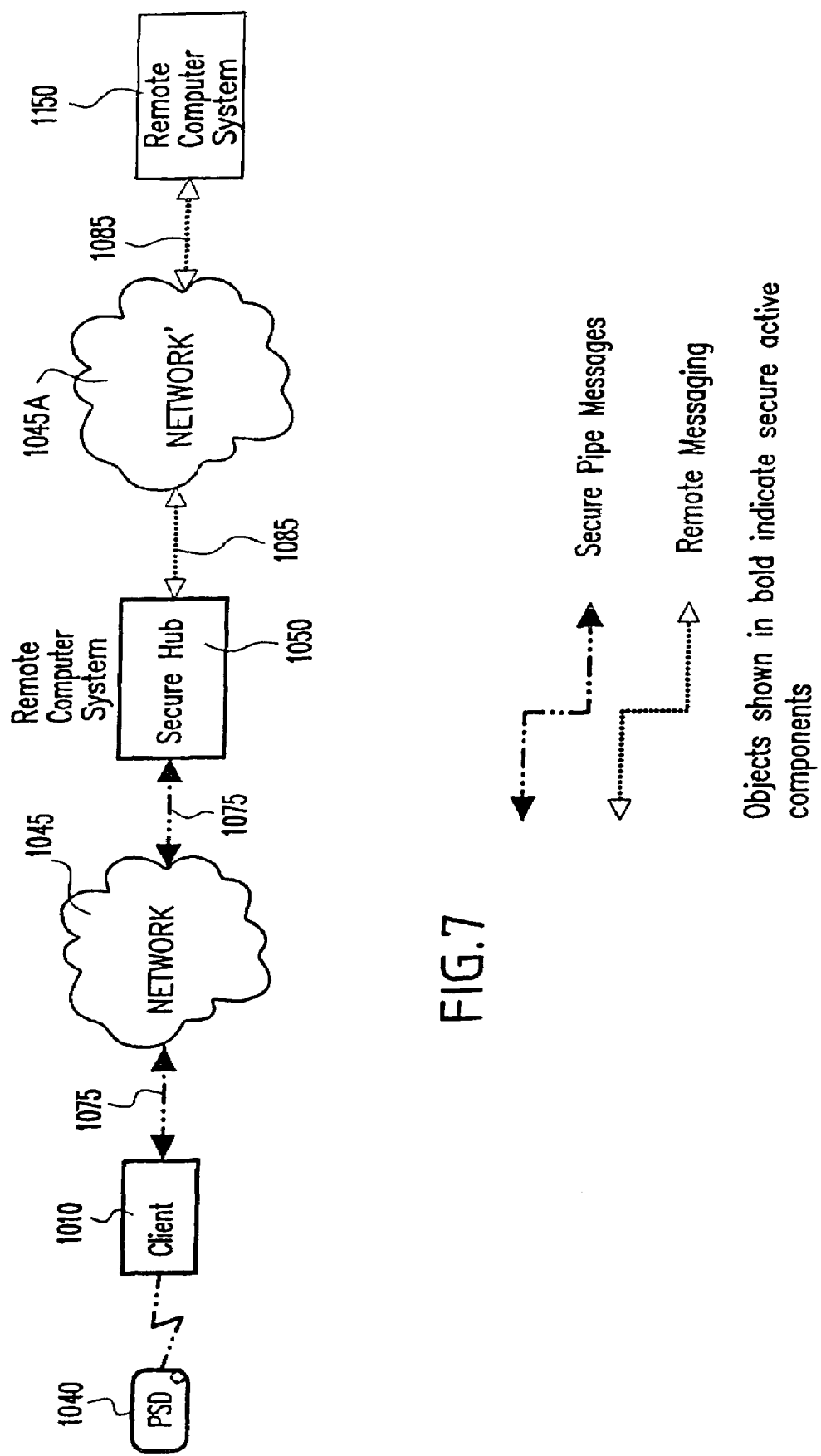
Figure 8:
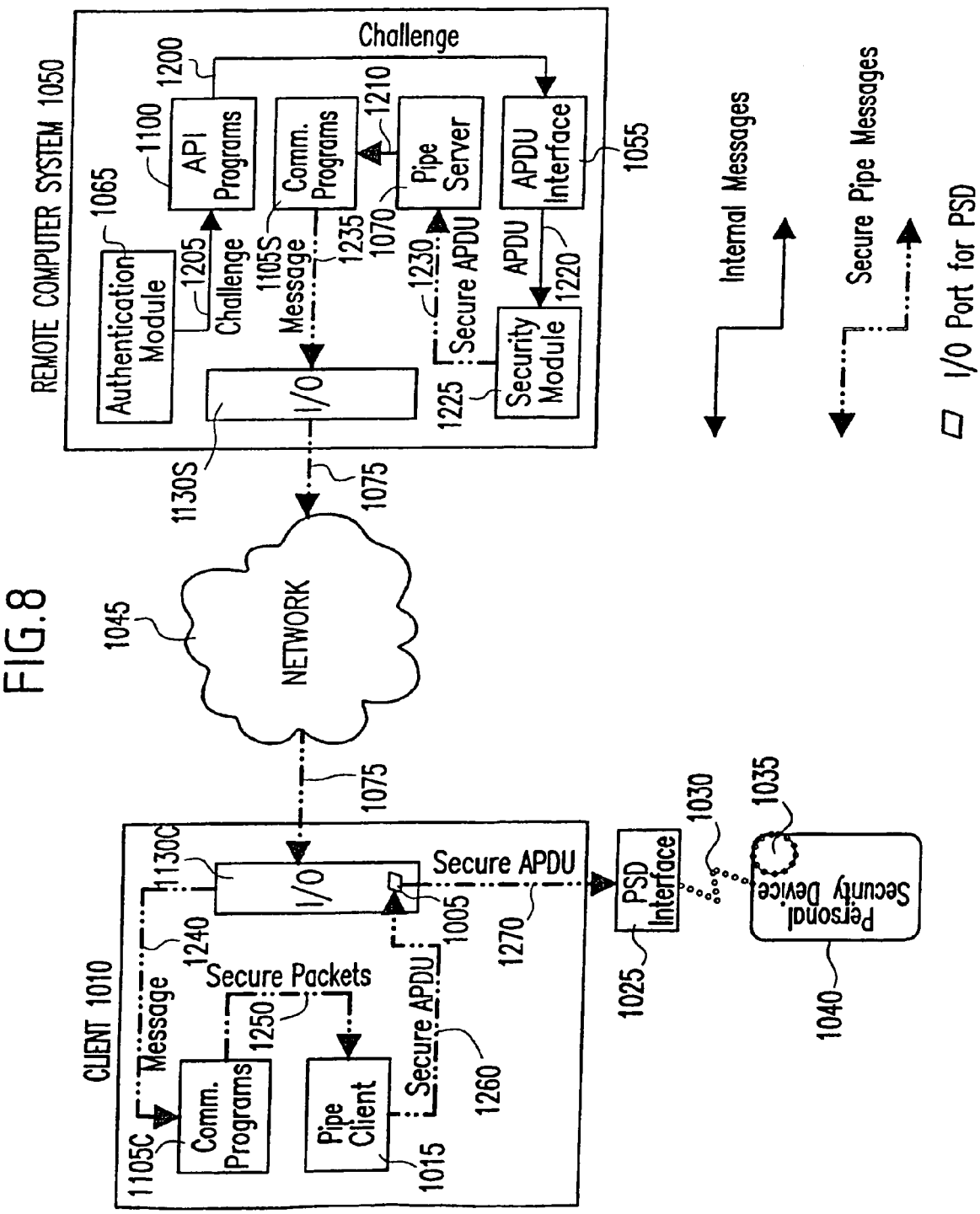
Figure 9:
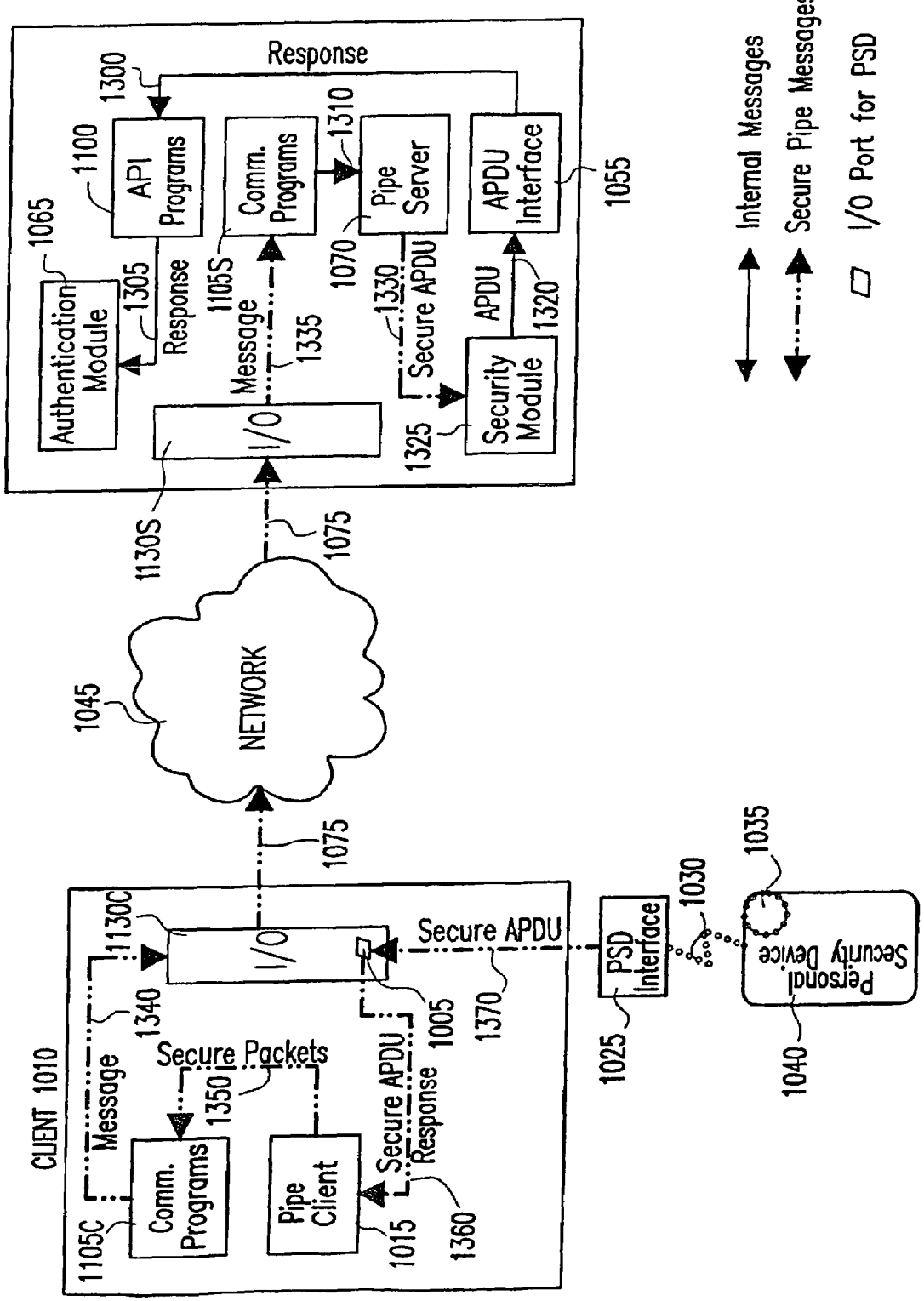
Figure 10:
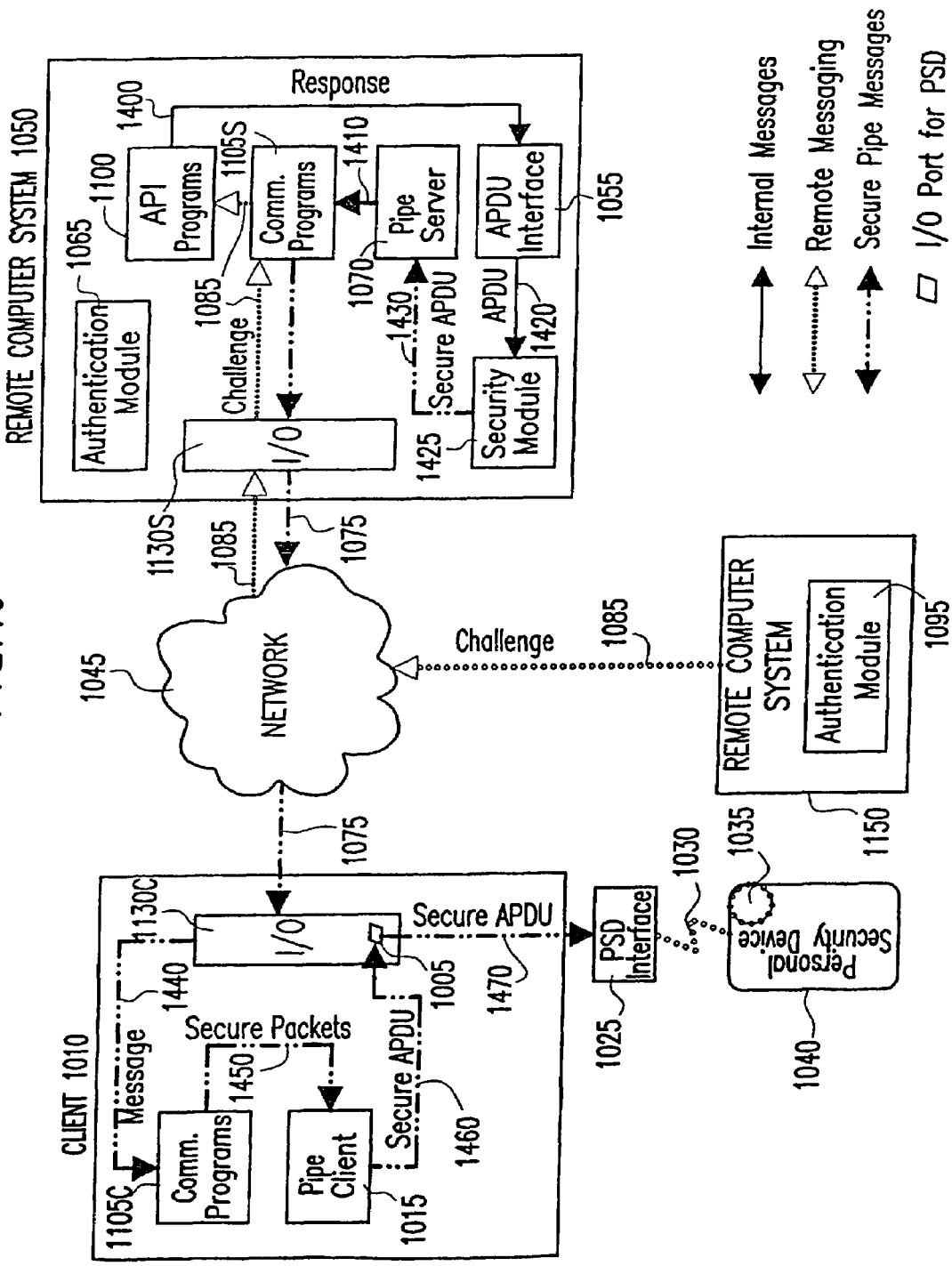
Figure 11:
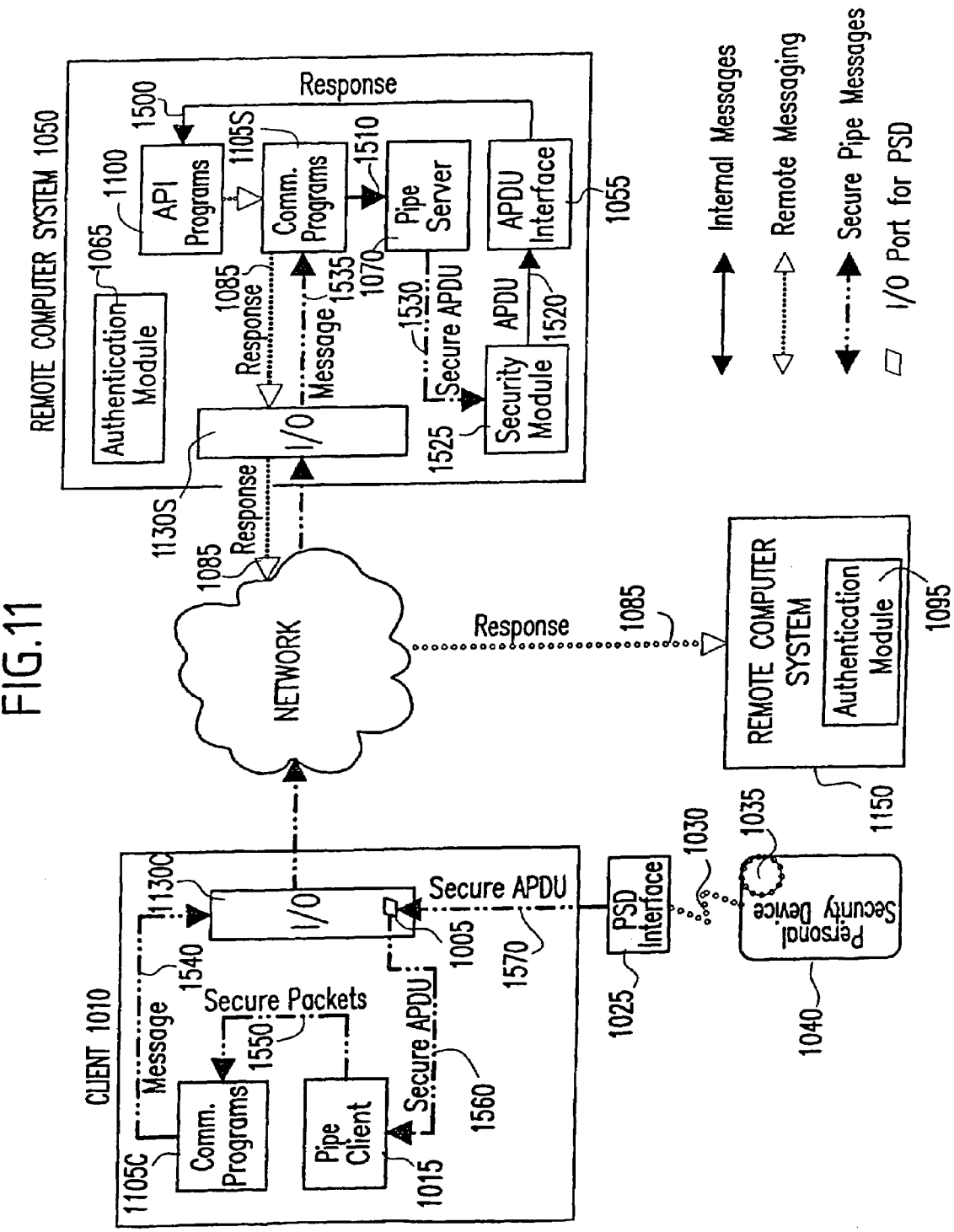
Figure 12:
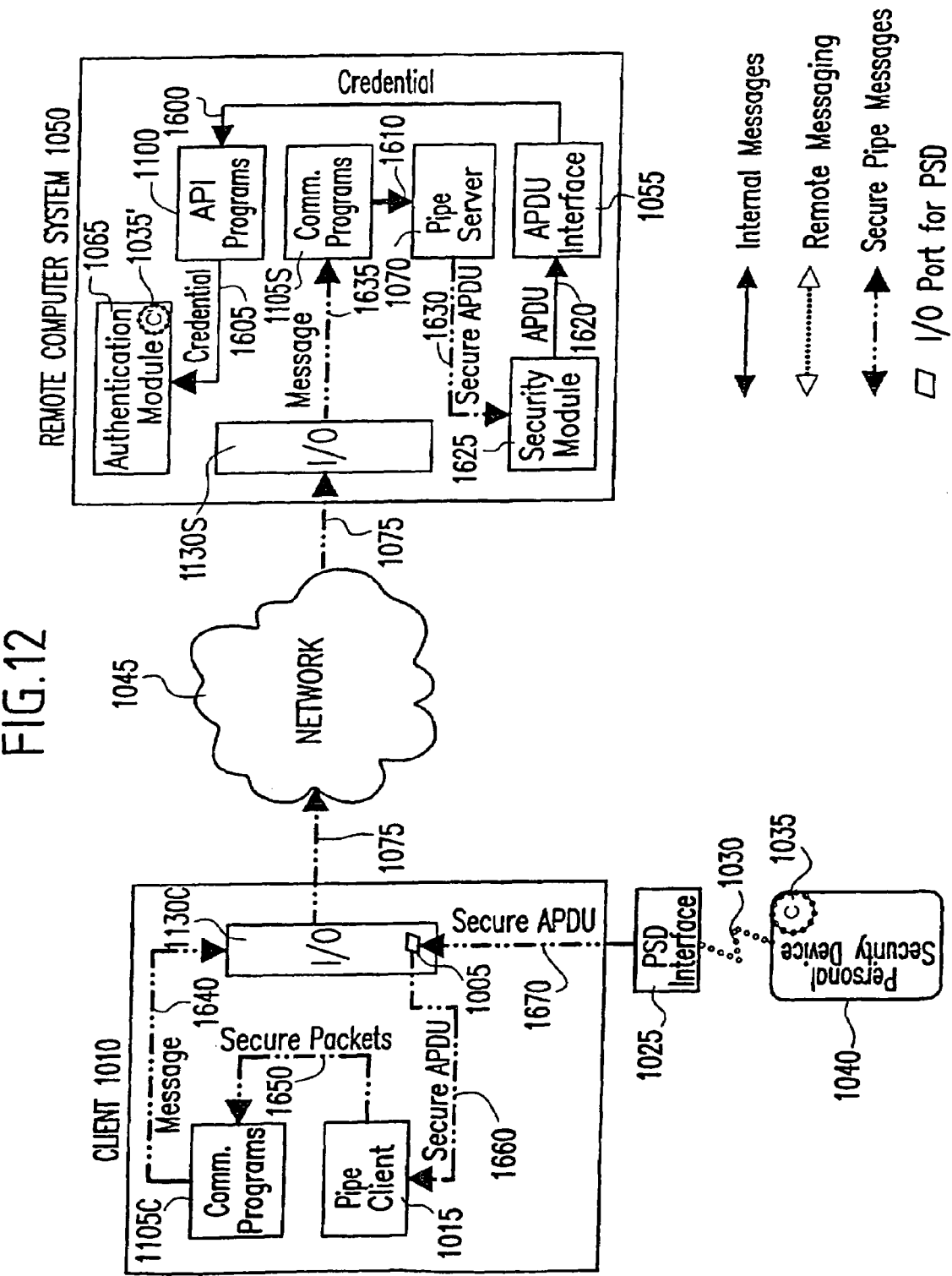
Figure 13:
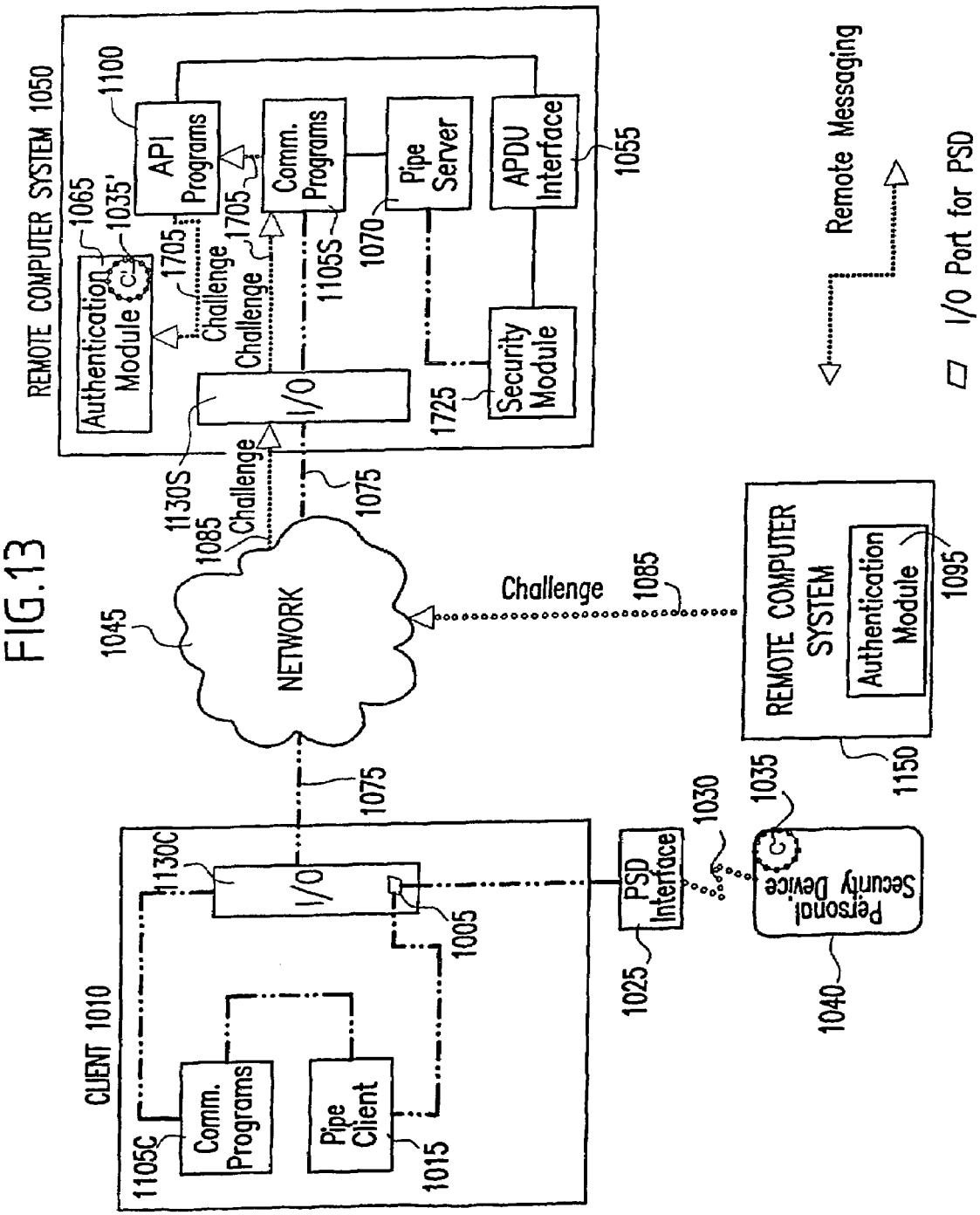

FIG. 1 is a generalized system block diagram for implementing a plain communications pipe, FIG. 2 is a detailed block diagram depicting initiating a plain communications pipe, FIG. 3 is a detailed block diagram depicting establishing a plain communications pipe, FIG. 4A is a generalized system block diagram for implementing a secure communications pipe which includes software-based security mechanisms, FIG. 4B is a generalized system block diagram for implementing a secure communications pipe which includes HSM-based security mechanisms, FIG. 5 is a detailed block diagram depicting initiating a secure communications pipe, FIG. 6 is a detailed block diagram depicting establishing a secure communications pipe, FIG. 7 is a general system block diagram for implementing the authentication of a PSD vis-à-vis at least one Remote Computer System, FIG. 8 is a detailed block diagram illustrating initial authentication challenge (first embodiment of the invention), FIG. 9 is a detailed block diagram illustrating initial authentication response (first embodiment of the invention), FIG. 10 is a detailed block diagram illustrating remote authentication challenge (first embodiment of the invention), FIG. 11 is a detailed block diagram illustrating remote authentication response (first embodiment of the invention), FIG. 12 is a detailed block diagram illustrating authentication credential transfer (second embodiment of the invention), FIG. 13 is a detailed block diagram illustrating remote authentication challenge (second embodiment of the invention), FIG. 14 is a detailed block diagram illustrating remote authentication (second embodiment of the invention).

5. DETAILED DESCRIPTION OF THE INVENTION

In a first part (section 5.1.), the present Detailed Description of the Invention will disclose how to establish a plain communications pipe and a secure communications pipe between a PSD and a Remote Computer System, generally speaking.

In a second part (section 5.2.), the present Detailed Description of the Invention will disclose how to enhance security of an authentication process of a PSD vis-à-vis a Remote Computer System using said secure communications pipe, and how to use said Remote Computer System as a secure hub for authentication of said PSD vis-à-vis a plurality of subsequent Remote Computer Systems.

Said second part of the Detailed Description will be based on the use of a secure communications pipe, but the present invention is not limited to such a use.

The use of a plain communications pipe, i.e. of a communications pipe which does not involve end-to-end cryptographic mechanisms, falls within the scope of the present invention.

Note also that the following description of the invention will be based on a PSD which receives and sends APDU-(Application Protocol Data Unit)-formatted messages.

APDU messaging format, which is per se known in the art, is a lower-level messaging format which allows a PSD to communicate with higher-level applications located in devices to which the PSD is to be connected.

It must be clear that the present invention is not limited to the use of an APDU messaging format, and that any other low-level messaging format that can be processed by the PSD enters within the scope of the present invention.

In the appended claims, a message having such a format will be designated by the generic expression "PSD-formatted message".

5.1. Establishment of a Communications Pipe

5.1.1. Plain Communications Pipe

Referring to FIG. 1, a generalized system block diagram of the architectures of a Client 10 and of a Remote Computer System 50 is shown. The various layers shown are based on the Open System Interconnection model (OSI). For simplicity, certain layers common to both the Client and Remote Computer System are not shown and should be assumed to be present and incorporated into adjacent layers. The layers common to both a Client and Remote Computer System include:
- an Applications Layer 90 which generally contains higher level software applications (e.g. word processor) and a user interface and such as a Graphical User Interface (GUI),
- an Applications Programming Interface (API) Layer 100 for processing and manipulating data for use by either higher or lower level applications,
- a Communications Layer 105 which contains communications programs including secure communications capabilities, which enable a Client to communicate with a Remote Computer System to exchange information in an agreed upon protocol and visa versa,
- an Operating System Layer 110 or equivalent runtime environment, which controls the allocation and usage of hardware resources such as memory, Central Processing Unit (CPU) time, disk space, hardware I/O port assignments, peripheral device management,
- a Hardware Drivers Layer 120 which permits the operating system to communicate and control physical devices connected to the Client's or Remote Computer System's hardware I/O bus,
- and a Physical Device Layer 130 where Network Interface Cards (NIC) 140 provide the physical connections to a telecommunications network 45. Other Hardware Devices 80 may also be connected at this Layer.

5.1.1.1. Client Specific Features

A specialized program contained within the API Layer 100 of the Client and referred to as a Pipe Client 15, interacts with Communications Programs contained within the Communications Layer 105. The Pipe Client 15 functions to separate encapsulated APDU requests from incoming messaging packets received from a network 45 for processing by a locally connected PSD 40. Alternately, outbound APDU responses generated by a locally connected PSD 40, are processed by the Pipe Client for encapsulation into an agreed upon communications protocol by Communications Programs contained within the Communications Layer 105.

A software driver contained within the Communications Layer 105 of the Client and referred to as a PSD Software Interface 20 directs incoming APDUs communicated by the Pipe Client 15 into the I/O device port connecting the PSD Hardware Device Interface 25 to the locally connected PSD 40. Outgoing APDUs generated by the PSD are communicated through the PSD Hardware Device Interface 25 through the I/O device port to the PSD Software Interface 20 and subsequently communicated to the Pipe Client 15.

5.1.1.2. Remote Computer System Specific Features

A first specialized program contained within the API Layer 100 of the Remote Computer System 50 and referred to as an APDU Interface 55, translates higher level messaging formats into low-level APDU messaging format required to communicate with a PSD 40. Alternately, the APDU Interface 55 translates incoming APDU responses received from a PSD 40 into higher level messaging formats used by programs in the API Layer 100 and Applications Layer 90 of the Remote Computer System.

A second specialized program contained within the API Layer 100 of the Remote Computer System 50 and referred to as a Pipe Server 70 interacts with Communications Programs contained within the Communications Layer 105. The Pipe Server 70 functions to separate encapsulated APDU requests from incoming messaging packets received from a network 45 for processing by the APDU Interface 55. Alternately, outbound APDU requests translated by the APDU Interface 55 are processed by the Pipe Server for encapsulation into an agreed upon communications protocol by Communications Programs contained within the Communications Layer 105.

5.1.1.3. Other Features

The connection 30 between the PSD 40 and PSD Hardware Interface 25 includes but is not limited to traditional electrical or optical fiber connections or wireless means including optical, radio, acoustical, magnetic, or electromechanical. Likewise the connection 75 between the Client 10 and the network 45, and the connection 75 between the Remote Computer System 50 and the network 45 may be accomplished analogously.

The network, shown generally at 45, includes both public and private telecommunications networks connected by traditional electrical, optical, electro-acoustical (DTMF) or by other wireless means. Any mutually agreed upon communications protocol capable of encapsulating APDU commands may be employed to establish a plain communications pipe including open or secure communications protocols.

Referring now to FIG. 2, depicts initiating a plain communications pipe between the Remote Computer System 50 and the PSD 40 connected to a Client 10. In this depiction, the Remote Computer System 50 is sending a request to PSD 40 for non-proprietary embedded information 35, for example an identification number. PSD 40 is connected 30 to the local Client 10 using PSD Interface 25. PSD Interface 25 communicates with the Client 10 via hardware device port 5.

To initiate a plain communications pipe between Remote Computer System 50 and PSD 40, the Remote Computer System 50 generates a request 200 by way of API programs 100 which is translated into APDU format 220 by the APDU Interface 55 and sent to the Pipe Server 70 for message encapsulation. The encapsulated APDUs are then sent 210 to the Communications Programs 105S for incorporation into outgoing message packets 230.

The message packets 230 containing the encapsulated APDUs are transmitted 75 over the network 45 via a Network Interface Card (I/O) 130S. The Client 10 receives the message packets 240 containing the encapsulated APDUs which are received from the network 45 via a Network Interface Card (I/O) 130C installed on the local Client. The incoming messages are processed by Client-side Communications Programs 105C and routed 250 into the Pipe Client 15 for APDU extraction. The extracted APDUs are sent 260 through hardware device port 5, routed 270 into the PSD Interface 25 and sent to PSD 40 via connection 30 for processing within PSD domain 35.

Alternative requests to form a plain communications pipe 75 between a Remote Computer System 50 and a PSD 40 may be initiated by Client 10 requesting access to information contained on one or more networked local Clients, by connecting a PSD 40 to PSD Interface 25 which initiates a request to form a plain communications pipe 75, or by another Remote Computer System requesting access to PSD 40.

Referring now to FIG. 3, depicts a PSD response which establishes the plain communications pipe between PSD 40 and Remote Computer System 50. In this depiction, the request previously received is processed within the PSD domain 35, which generates a response message. The PSD response is sent in APDU format from PSD 40 through connection 30 and into PSD interface 25. The PSD response is then routed 370 through hardware device port 5 and sent 360 to the Pipe Client 15 for processing and encapsulation. The resulting message packets are then sent 350 to the Client-side Communications Programs 105C for incorporation into outgoing message packets 340. The message packets 340 containing the encapsulated APDUs are transmitted 75 over the network 45 via the Network Interface Card (I/O) 130C.

The Remote Computer System 50 receives the message packets 330 containing the encapsulated APDUs, which are received from the network 45 via the Network Interface Card (I/O) 130S installed on the Remote Computer System. The incoming messages are processed by server-side Communications Programs 105S and routed 310 into the Pipe Server 70 for APDU extraction. The extracted APDUs are sent 320 to the APDU Interface 55 for processing and translation into a higher-level format and sent 300 to API Level programs 100 for processing and further transactions with the PSD 40 if desired.

5.1.2. Secure Communications Pipe

Referring now to FIG. 4A, a generalized system block diagram of one implementation of a secure communications pipe is shown. The general system block diagram includes an additional software-based Cryptography Module 470 installed on the Remote Computer System, which is not shown in FIG. 1.

FIG. 4B depicts an alternative to using software-based security mechanisms. In this alternative, a Hardware Security Module (HSM) 440 is employed to perform cryptographic functions. To access the HSM, a software driver referred to as an HSM S/W Interface 475, is included in the API Layer 100. The HSM software driver communicates with a physical device interface included in the Physical Device Layer 130. The physical device interface is installed on the I/O bus of the Remote Computer System, and is referred to as an HSM H/W Interface 485. The HSM module 440 is connected 430 to the HSM H/W Interface in a manner analogous to the PSD connection to the PSD Interface previously described. The use of HSM technologies provides end-to-end security, which further reduces the possibility of unauthorized disclosure of cryptographic or sensitive information.

Both APDU messaging security mechanisms shown in FIGS. 4A & 4B are used to generate cryptographic keys necessary to unlock secure functions and data contained within the secure domain of a PSD, encrypt outgoing APDUs and decrypt incoming encrypted APDUs. The security mechanisms employed in generating a secure pipe may include synchronous, asynchronous or any combination of cryptography methods.

Secure communications protocols used to communicate over a network are accomplished by the Communications Programs contained within the Communications Layers 105. Cryptography used in generating secure communications may employ the security mechanisms described for APDU messaging, employ separate mechanisms or employ any combination thereof.

Referring now to FIG. 5, depicts the initiating of a secure pipe between the Remote Computer System and the PSD 40 connected to Client 10. In this depiction, Remote Computer System 50 is sending a secure request to PSD 40 for proprietary embedded information 35, for example an authentication password. PSD 40 is connected 30 to the local Client 10 using PSD Interface 25. PSD Interface 25 communicates with the Client 10 via hardware device port 5.

To initiate a secure communications pipe between Remote Computer System 50 and PSD 40, a request 500 is generated on Remote Computer System 50 to access PSD 40 by way of API programs 100 which are translated into APDU format by the APDU Interface 55. The APDUs are then sent 520 to a Security Module 525 for encryption using a pre-established cryptography method. The proper cryptographic parameters may be determined by using a look-up table or database, which cross-references the PSD's unique internal identification information with one or more codes necessary to implement the appointed cryptography method.

The encrypted APDUs are then routed 510 to the Pipe Server 70 for message encapsulation. The encapsulated APDUs are then sent 530 to the Communications Programs 105 for processing, encryption using a pre-established secure communications protocol and incorporation into outgoing message packets 535. The secure message packets 535 containing the encrypted and encapsulated APDUs are transmitted 75 over the network 45 via a Network Interface Card (I/O) 130S.

The Client 10 receives the message packets 540 containing the encrypted and encapsulated APDUs which are received from the network 45 via a Network Interface Card (I/O) 130C installed on the local Client 10.

The incoming encrypted message packets are decrypted and processed using the pre-established cryptography employed in the secure communications protocol by Client-side Communications Programs 105C. The unencrypted message packets still containing the encrypted APDUs are routed 550 into the Pipe Client 15 for APDU extraction. The extracted APDUs are sent 560 through hardware device port 5, routed 570 into the PSD Interface 25 and sent to PSD 40 via connection 30 for decryption and processing within the secure domain 35 of the PSD 40. Using a pre-established cryptography method, incoming secure APDUs are decrypted and requests processed.

Referring now to FIG. 6, depicts a PSD secure response, which establishes the secure communications pipe between PSD 40 and Remote Computer System 50. In this depiction, the secure request previously received is processed within the secure domain 35 of the PSD 40, which causes the PSD to generate a secure response message using a pre-established cryptography method.

The PSD secure response is sent in APDU format from PSD 40 through connection 30 and into PSD interface 25. The PSD secure response is then routed 670 through hardware device port 5 and sent 660 to the Pipe Client 15 for processing and encapsulation. The resulting message packets are then sent 650 to the Client-side Communications Programs 105 for processing, encryption using a pre-established secure communications protocol and incorporation into outgoing message packets 640. The message packets 640 containing the encapsulated APDUs are transmitted 75 over the network 45 via the Network Interface Card (I/O) 130C.

The Remote Computer System 50 receives the message packets 635 containing the encapsulated APDUs from the network 45 via the Network Interface Card (I/O) 130S installed on the Remote Computer System 50. The incoming messages are processed and decrypted using the pre-established cryptography method employed in the secure communications protocol by the server-side Communications Programs 105 and routed 610 into the Pipe Server 70 for secure APDU extraction. The extracted secure APDUs are sent 630 to the Security Module 525 for decryption of the secure APDUs using the pre-established cryptography method. The decrypted APDUs are then routed 620 to the APDU Interface 55 for processing and translation into a higher-level format and sent 600 to API programs 100 for processing and further transactions with the PSD 40 if desired. This step establishes the secure "pipe" to communicate with the PSD. The secure pipe is maintained until the Remote Computer System signals the Client to close the hardware interface port 5.

No limitation is intended in the number of PSDs and Clients forming communications pipes 75 with one or more Remote Computer System(s) 50, nor should any limitation on the number of Remote Computer Systems 50 available for generating communications pipes 75 be construed from the drawings. Lastly, no limitation is intended concerning the initiating event to establish a communications pipe.

5.2. Authentication Method and System Using a Communications Pipe

As already mentioned above, description of said authentication method and system will be based on the use of a secure communications pipe, but the present invention is not limited to such a use.

The use of a plain communications pipe falls within the scope of the present invention.

The steps involved in performing authentication through a secure communications pipe are shown in FIGS. 7 through 14. FIG. 7 is a generalized system block diagram. FIGS. 8 through 11 illustrate a first embodiment of the invention where responses to authentication challenges are generated within the secure domain of a Personal Security Device. FIGS. 12 through 14 illustrate a second embodiment of the invention where a Remote Computer System acting as a secure hub provides the proper response to authentication challenges, rather than directing challenges through the communications pipe into the PSD for processing. Characters shown with a prime sign (e.g. C') indicate a duplicate of an original authentication credential. Other drawing details shown but not described refer to information described in previous section 5.1.

Referring now to FIG. 7, a generalized system block diagram of the invention is depicted, where a Personal Security Device 1040 is connected to a Client 1010 which is itself connected over a network 1045 to a Remote Computer System 1050 using a secure communications pipe 1075 as described in previous section 5.1.2. Remote Computer System 1050 is operating as a secure hub following initial authentication as described below, to service authentication requests made by subsequent Remote Computer Systems sent over a network 1045 or 1045A.

The subsequent Remote Computer System 1150 is an example of a system requiring authentication when a request for secure functions or data is sent from Client computer 1010 over the networks 1045 and 1045A. The secure communications pipe 1075 applies to authentication transactions but does not restrict nor control non-secure transactions occurring over either network 1045 or 1045A.

Networks 1045 and 1045A may be a common network as in a virtual private networking arrangement or separate networks such as private intranet and public internet arrangements. The networks 1045 and 1045A are depicted separately for illustrative purposes only. No limitation is intended in the number of PSDs and Clients forming communications pipes 1075 with one or more secure hubs 1050; nor should any limitation on the number of subsequent Remote Computer Systems 1150 available for authentication be construed from the drawing. Transactions not involving authentications are not restricted to the secure hub.

The basic operation of the secure hub may be initiated when an end user at a Client requests access to secure functions or data contained on one or more Remote Computer Systems connected by a network. An available Remote Computer System, in which a secure communications pipe has been established as described in previous section 5.1.2., authenticates the end user and Client using the security mechanisms contained within the secure domain of the PSD. Alternatively, an external event such as a need to update information within a PSD may trigger a subsequent Remote Computer System to initiate the authentication process.

Once an initial Client authentication has been accomplished by the available Remote Computer System, subsequent authentication challenges transmitted over a network 1045 or 1045A made by subsequent Remote Computer Systems are directed to the Remote Computer System 1050 acting as a secure hub and depending on which embodiment of the invention employed, are either routed through the appropriate communications pipe 1075 to PSD 1040 or are directly authenticated by the Remote Computer System 1050.

5.2.1. First Embodiment of the Invention

Referring to FIG. 8, to establish a secure hub, a Client 1010 causes an authentication challenge to be generated on a Remote Computer System 1050, by requesting access to secure functions or data over a network 1045. Upon receiving the request from Client 1010, the Remote Computer System 1050 generates an authentication challenge 1205 within a secure domain designated as authentication routine 1065. The authentication challenge is processed by an API level program 1100 and routed 1200 to an APDU interface 1055 for translation into an APDU format. The APDUs are then sent 1220 to a Security Module 1225 for encryption. The encrypted APDUs are then routed 1230 to a Pipe Server 1070 for encapsulation into outgoing messaging and sent 1210 to the Communications Programs 1105S for transmission over the communications pipe 1075, through the network 1045 into the network interface 1130C of the Client 10. The incoming messages are then routed 1240 to Communications Programs 1105C for processing.

Following processing, the messages are sent 1250 to a Pipe Client 1015 for separation of the encapsulated APDUs. The APDUs are then sent 1260 through a hardware device port 1005 assigned to a PSD Interface 1025. PSD Interface 1025 routes the incoming APDUs into the PSD 1040 via connection 1030, where it is subsequently decrypted and processed within its secure domain 1035.

Referring to FIG. 9, once PSD 1040 has processed the authentication challenge within the secure domain 1035 of the PSD, an authentication response message is generated using a pre-established cryptography method.

The authentication response is sent in APDU format from PSD 1040 through connection 1030 and into PSD interface 1025. The PSD secure response is then routed 1370 through hardware device port 1005 and sent 1360 to the Pipe Client 1015 for processing and encapsulation. The resulting message packets are then sent 1350 to the Client-side Communications Programs 1105C for processing, encryption using a pre-established secure communications protocol and incorporation into outgoing message packets 1340. The message packets 1340 containing the encapsulated APDUs are transmitted 1075 over the network 1045 via a network interface card (I/O) 1130C.

The Remote Computer System 1050 receives the message packets 1335 containing the encapsulated APDUs from the network 1045 via a network interface card (I/O) 1130S installed on the Remote Computer System. The incoming messages are processed and decrypted using the pre-established cryptography method employed in the secure communications protocol by the server-side Communications Programs 1105S and routed 1310 into the Pipe Server 1070 for secure APDU extraction. The extracted secure APDUs are sent 1330 to the Security Module 1325 for decryption of the secure APDUs using the pre-established cryptography method. The decrypted APDUs are then routed to the APDU Interface 1055 for processing and translation into a higher-level format and sent 1300 to API Level programs 1100 for processing. If authentication is successful, the Remote Computer System 1050 allows access to secure functions or data and establishes itself as a secure hub. If authentication fails, the end user will be unable to access secure functions or data.

Referring to FIG. 10, once the secure hub has been established as previously described, remote authentication of subsequent Remote Computer Systems may be accomplished. Remote authentication may be initiated either by a Client's request for access to secure functions or data or by other Remote Computer Systems to perform transactions within the secure domain of a PSD.

To perform a remote authentication, a challenge 1085 is issued by a subsequent Remote Computer System 1150. The challenge is routed over a network 1045, into the secure hub 1050. The incoming challenge is processed and decrypted in the secure hub 1050 using the pre-established cryptography method employed in the secure communications protocol by the server-side Communications Programs 1105S and routed 1085 to an API level program 1100 where it is processed and routed 1400 to an APDU interface 1055 for translation into an APDU format. The APDUs are then sent 1420 to a Security Module 1425 for encryption. The encrypted APDUs are then routed 1430 to a Pipe Server 1070 for encapsulation into outgoing messaging and sent 1410 to the communications programs 1105S for transmission over the communications pipe 1075, through the network 1045 into the network interface 1130C of the Client 1010.

The incoming messages are then routed 1440 to Communications Programs 1105C for processing. Following processing, the messages are sent 1450 to a Pipe Client 1015 for separation of the encapsulated APDUs. The APDUs are then sent 1460 through a hardware device port 1005 assigned to a PSD Interface 1025. PSD Interface 1025 routes the incoming APDUs into the PSD 1040 via connection 1030, where it is subsequently decrypted and processed within its secure domain 1035.

Referring to FIG. 11, once PSD 1040 has processed the authentication challenge within its secure domain 1035, an authentication response message is generated using a pre-established cryptography method. The authentication response is sent in APDU format from PSD 1040 through connection 1030 and into PSD interface 1025. The PSD secure response is then routed 1570 through hardware device port 1005 and sent 1560 to the Pipe Client 1015 for processing and encapsulation. The resulting message packets are then sent 1550 to the Client-side Communications Programs 1105C for processing, encryption using a pre-established secure communications protocol and incorporation into outgoing message packets 1540. The message packets 1540 containing the encapsulated APDUs are transmitted 1075 over the network 1045 via network interface card (I/O) 1130C.

The secure hub 1050 receives the message packets 1535 containing the encapsulated APDUs from the network 1045 via network interface card (I/O) 1130S. The incoming messages are processed and decrypted using the pre-established cryptography method employed in the secure communications protocol by the server-side Communications Programs 1105S and routed 1510 into the Pipe Server 1070 for secure APDU extraction. The extracted secure APDUs are sent 1530 to the Security Module 1525 for decryption of the secure APDUs using the pre-established cryptography method. The decrypted APDUs are then routed 1520 to the APDU Interface 1055 for processing and translation into a higher-level format and sent 1500 to API Level programs 1100 for processing. Authentication Module 1065 within the secure hub 1050 remains inactive during the transfer of authentication information. The authentication response message is then routed 1085 into the Communications Programs 1105S where the response is sent over the network 1045 in a pre-established secure communications protocol to the challenging subsequent Remote Computer System 1150.

The incoming response message is decrypted and sent to an Authentication Module 1095. If authentication is successful, the subsequent Remote Computer System 1150 allows access to secure functions or data. If authentication fails, the end user will be unable to access secure functions or data.

5.2.2. Second Embodiment of the Invention

Referring to FIG. 12 depicts an alternate embodiment of the current invention where the Remote Computer System 1050 transfers copies of the PSD credentials C 1035, if not pre-existing on said Remote computer System 1050. To perform credential transfer, an initial authentication transaction is performed by the Remote Computer System 1050 as previously described. Following authentication, additional commands are sent by the Remote Computer System 1050 to transfer the specified credentials.

The credentials are generated using a pre-established cryptography method and sent in APDU format from PSD 1040 through connection 1030 and into PSD interface 1025. The PSD secure response is then routed 1670 through hardware device port 1005 and sent 1660 to the Pipe Client 1015 for processing and encapsulation. The resulting message packets are then sent 1650 to the Client-side Communications Programs 1105C for processing, encryption using a pre-established secure communications protocol and incorporation into outgoing message packets 1640. The message packets 640 containing the encapsulated APDUs are transmitted 1075 over the network 1045 via a network interface card (I/O) 1130C.

The Remote Computer System 1050 receives the message packets 1635 containing the encapsulated APDUs from the network 1045 via network interface card (I/O) 1130S installed on the Remote Computer System.

The incoming messages are processed and decrypted using the pre-established cryptography method employed in the secure communications protocol by the server-side Communications Programs 1105S and routed 1610 into the Pipe Server 1070 for secure APDU extraction. The extracted secure APDUs are sent 1630 to the Security Module 1625 for decryption of the secure APDUs using the pre-established cryptography method. The decrypted APDUs are then routed 1620 to the APDU Interface 1055 for processing and translation into a higher-level format and sent 1600 to API Level programs 1100 for processing and subsequently sent 1605 to the Authentication Module 1065 for secure storage and future use. The transferred authentication information is shown in FIG. 12 as C'.

In FIG. 13, an authentication challenge 1085 is sent by a subsequent Remote Computer System 1150 over a network 1045. The Remote Computer System 1050 acting as a secure hub receives the incoming challenge 1085 from the network 1045 via network interface card 1130S installed on the Remote Computer System 1050. The incoming challenges 1085 are processed and decrypted using the pre-established cryptography method employed in the secure communications protocol by the server-side Communications Programs 1105S and routed to API Level programs 1100 for processing. The processed challenge is then sent 1705 to the Authentication Module 1065 for authentication using the PSD's transferred credentials C' 1035'. The communications pipe 1075 may remain intact during this process to allow for other transactions to occur.

Referring to FIG. 14, the secure hub 1050 generates an authentication reply within the Authentication Module 1065 which is sent 1805 to the API Level Programs 1100 for processing, and subsequently routed 1810 to the Server-side Communications Programs 1105S for processing, encryption using a pre-established secure communications protocol and incorporation into outgoing message packets. The message packets are routed over the network 1045 to the challenging subsequent Remote Computer System 1150. The incoming messages are then decrypted and the authentication reply processed by an internal authentication module 1095. If authentication is successful, the subsequent Remote Computer System 1150 allows access to secure functions or data. If authentication fails, the end user will be unable to access secure functions or data.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that the scope of the invention be limited by this Detailed Description, but rather by the claims following herein.

What is claimed is:

1. A method for authenticating at least one Personal Security Device (PSD) vis-à-vis at least a first Remote Computer System over a first network using at least one Client as a host to said at least one PSD, said method comprising:
   a) generating or retrieving, in said at least first Remote Computer System, a first authentication challenge as a PSD-formatted challenge,
   b) encapsulating on said first Remote Computer System said PSD-formatted challenge into an agreed upon communications protocol thus producing an encapsulated challenge,
   c) transmitting said encapsulated challenge from said at least first Remote Computer System to said at least one Client over said first network using said agreed upon communications protocol,
   d) decapsulating on said Client said encapsulated challenge thus separating said PSD-formatted challenge from said encapsulated challenge,
   e) routing on said Client said PSD-formatted challenge including said first authentication challenge to a PSD interface which is in processing communication with said PSD, independently of the origin and integrity of said encapsulated challenge,
   f) challenging said at least one PSD with said first authentication challenge, thereby generating a first authentication response as a PSD-formatted response on said PSD,
   g) transmitting said PSD-formatted response from said at least one PSD to said Client through said PSD interface,
   h) encapsulating on said Client said PSD-formatted response into said agreed upon communications protocol thus producing an encapsulated response,
   i) transmitting said encapsulated response from said Client to said at least first Remote Computer System over said first network using said agreed upon communications protocol,
   j) decapsulating on said at least first Remote Computer System said encapsulated response thus separating said PSD-formatted response from said encapsulated response,
   k) converting on said at least first Remote Computer System said PSD-formatted response into a higher-level formatted first authentication response, and l) authenticating, in said at least first Remote Computer System, said first authentication response.

2. The method according to claim 1, further comprising the steps of:
encrypting said first authentication challenge in said at least first Remote Computer System transmitting it to said at least one Client,
decrypting said first authentication challenge in said at least one PSD before challenging said PSD,
encrypting said first authentication response in said at least one PSD before transmitting it to said at least one Client, and
decrypting said first authentication response in said at least first Remote Computer System authenticating it.

3. The method according to claim 1 or 2 for authenticating said at least one PSD vis-à-vis at least one subsequent Remote Computer System which is functionally connected to said at least first Remote Computer System through a second network, said method further comprising:
generating or retrieving, in said at least one subsequent Remote Computer System, a second authentication challenge,
transmitting said second authentication challenge from said at least one subsequent Remote Computer System to said at least first Remote Computer System via said second network,
converting said second authentication challenge on said at least first Remote Computer System in a PSD-formatted challenge message,
applying b) to e) to said PSD-formatted challenge,
challenging said at least one PSD with said second authentication challenge, thereby generating a second authentication response as a PSD-formatted response on said PSD,
applying g) to k) to said PSD-formatted response,
transmitting said second authentication response from said at least first Remote Computer System to said at least one subsequent Remote Computer System via said second network, and
authenticating, in said at least one subsequent Remote Computer System said second authentication response.

4. The method according to claim 3, further comprising:
encrypting said second authentication challenge in said at least first Remote Computer System transmitting it to said at least one Client,
decrypting said second authentication challenge in said at least one PSD, challenging said PSD,
encrypting said second authentication response in said at least one PSD before transmitting it to said at least one Client, and
decrypting said second authentication response in said at least first Remote Computer System transmitting it to said at least one subsequent Remote Computer System.

5. The method according to claim 1 or 2 for authenticating said at least one PSD vis-à-vis at least one subsequent Remote Computer System which is functionally connected to said at least first Remote Computer System through a second network, said method further comprising:
sending to said at least one PSD a credentials transfer command,
applying g) to j) to credentials stored in said at least one PSD,
storing said credentials in said at least first Remote Computer System,
generating or retrieving, in said at least one subsequent Remote Computer System a second authentication challenge,
transmitting said second authentication challenge from said at least one subsequent Remote Computer System to said at least first Remote Computer System via said second network,
challenging said stored credentials with said second authentication challenge, thereby generating a second authentication response,
transmitting said second authentication response from said at least first Remote Computer System to said at least one subsequent Remote Computer System via said second network, and
authenticating, in said at least one subsequent Remote Computer System said second authentication response.

6. The method according to claim 5, further comprising:
encrypting said credentials in said at least one PSD before transmitting them to said at least one Client, and
decrypting said credentials in said at least first Remote Computer System before storing them.

7. The method according to claim 1 or 2, comprising a) to l) upon a request generated by said at least one Client.

8. The method according to claim 1 or 2, comprising a) to l) upon a request generated by at least one networked Remote Computer System.

9. The method according to claim 1, wherein PSD-formatted messages are APDU-formatted messages.

10. A Client for authenticating at least one Personal Security Device (PSD) vis-à-vis at least a first Remote Computer System through at least one communications pipe established over a first network using said Client as a host to said at least one PSD wherein said Client comprises:
a Pipe Client to separate encapsulated PSD-formatted authentication challenges from incoming messaging packets received from a network according to an agreed upon communications protocol for processing by said locally connected PSD, and to encapsulate outbound PSD-formatted authentication responses generated by said PSD into said agreed upon communications protocol, and
a PSD software interface to route said decapsulated PSD-formatted authentication challenges to said PSD, independently of the origin and integrity of said encapsulated PSD-formatted authentication challenges, and to communicate said outbound PSD-formatted authentication responses to said Pipe Client.

11. An authentication system, comprising at least one Client according to claim 10 and at least a first Remote Computer System for authenticating at least one Personal Security Device (PSD) vis-à-vis said first Remote Computer System through at least one communications pipe established over a first network using said Client as a host to said at least one PSD, wherein said first Remote Computer System comprises:
a PSD-format Interface to translate high-level authentication challenges into low-level PSD-formatted authentication challenges, and to translate low-level PSD-formatted authentication responses into high-level authentication responses, and
a Pipe server to separate encapsulated PSD-formatted responses from incoming messaging packets received from a network according to an agreed upon communications protocol for processing by said PSD-format Interface, and to encapsulate outbound PSD-formatted challenges generated by said PSD-format Interface into said agreed upon communications protocol.

12. The authentication system according to claim 11, further comprising at least one subsequent Remote Computer System functionally connected to said at least first Remote Computer System through a second network, wherein said at least one subsequent Remote Computer System comprises a section that generates at least a second authentication challenge, for transmitting said at least second authentication challenge to said at least first Remote Computer System through said second network and for that authenticates said at least second authentication response to said at least second authentication challenge.

13. The authentication system according to claim 11, further comprising said at least one PSD wherein said at least one PSD comprises an authentication section for generating said first authentication response to said first authentication challenge.

14. The authentication system according to claim 12, wherein said first and second networks form one same network.

15. A Remote Computer System for authenticating at least one Personal Security Device (PSD) vis-à-vis said Remote Computer System through at least one communications pipe established over a first network using said a Client as a host to said at least one PSD wherein said Remote Computer System comprises:
   a PSD-format Interface to translate high-level authentication challenges into low-level PSD-formatted authentication challenges, and to translate low-level PSD-formatted authentication responses into high-level authentication responses, and
   a Pipe server to separate encapsulated PSD-formatted responses from incoming messaging packets received from a network according to an agreed upon communications protocol for processing by said PSD-format Interface, and to encapsulate outbound PSD-formatted challenges generated by said PSD-format Interface into said agreed upon communications protocol.

16. The Remote Computer System according to claim 15, further comprising a, cryptographic section for encrypting said outgoing PSD-formatted challenges and for decrypting said incoming PSD-formatted responses.

17. The Remote Computer System according to claim 15, further comprising:
   a section that processes and routes to said at least one PSD through said at least one communications pipe, as an outgoing PSD-formatted message, at least a second authentication challenge received over a second network from at least one subsequent Remote Computer System, and for
   a section that processes and routes to said at least one subsequent Remote Computer System at least a second authentication response to said at least second authentication challenge said at least second authentication response being generated by said at least one PSD and transmitted to said at least one subsequent Remote Computer System through said at least one communications pipe as an incoming PSD-formatted message.

18. The remote Computer System according to claim 15, further comprising a section that stores credentials imported from said at least one PSD through said at least one communications pipe as an incoming PSD-formatted message, and a section that challenges said stored credentials with at least a second authentication challenge received over a second network from at least one subsequent Remote Computer System.

* * * * *

UNITED STATES PATENT AND TRADEMARK OFFICE
CERTIFICATE OF CORRECTION

PATENT NO. : 7,316,030 B2  Page 1 of 1
APPLICATION NO. : 10/476316
DATED : January 1, 2008
INVENTOR(S) : Audebert et al.

It is certified that error appears in the above-identified patent and that said Letters Patent is hereby corrected as shown below:

Col. 1, line 5
Please insert the following paragraph:

-- RELATED APPLICATIONS

This application is a 371 US National Stage application of PCT/EP02/03929 filed April 9, 2002, which is a continuation-in-part of U.S. Application No. 09/844,246 filed April 30, 2001, now abandoned, and which is a continuation-in-part of U.S. Application No. 09/844,439 filed April 30, 2001, now U.S. Patent No. 7,363,486 issued April 22, 2008. --

Signed and Sealed this
First Day of February, 2011

David J. Kappos
*Director of the United States Patent and Trademark Office*